United States Patent Office 3,480,216
Patented Nov. 25, 1969

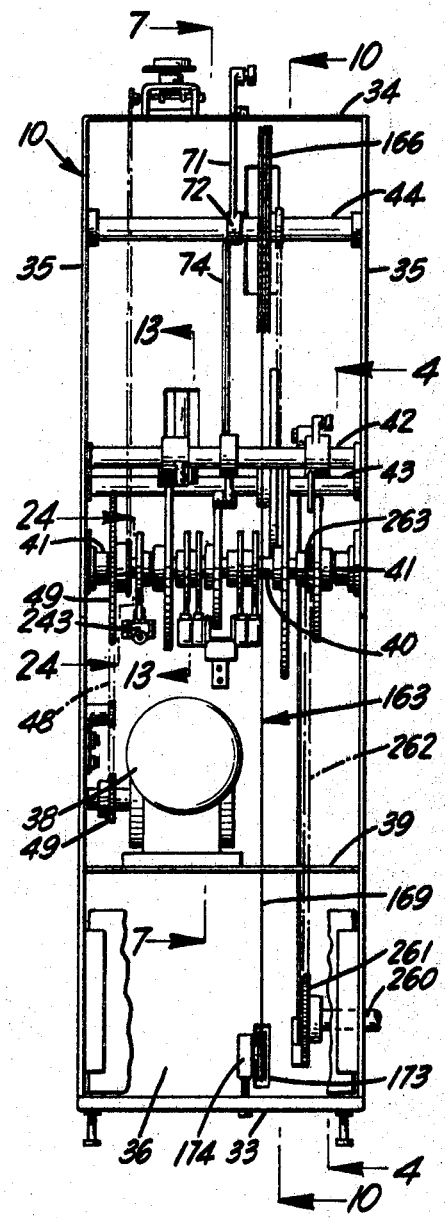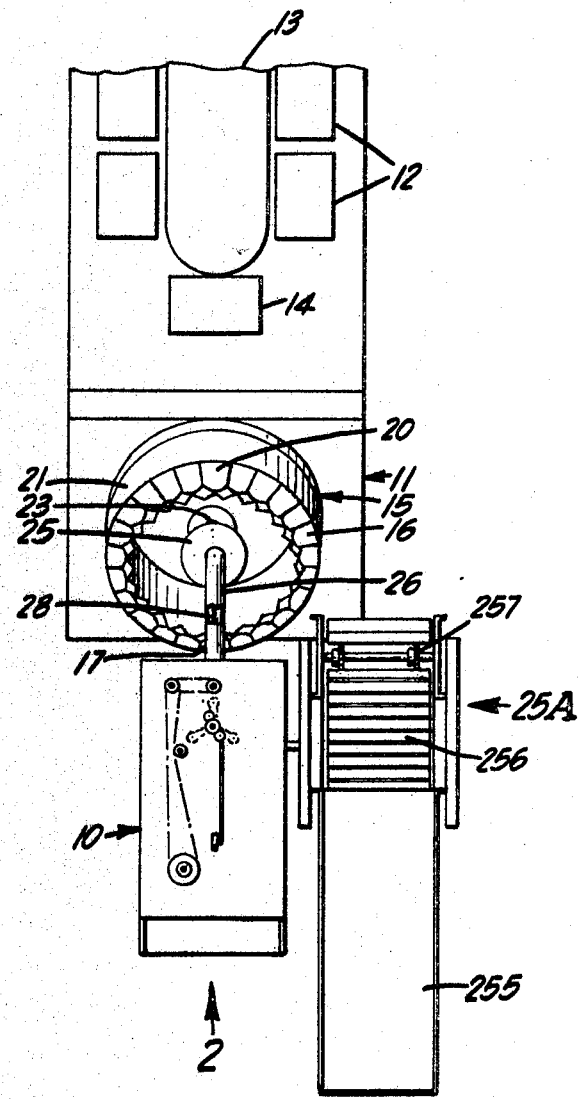

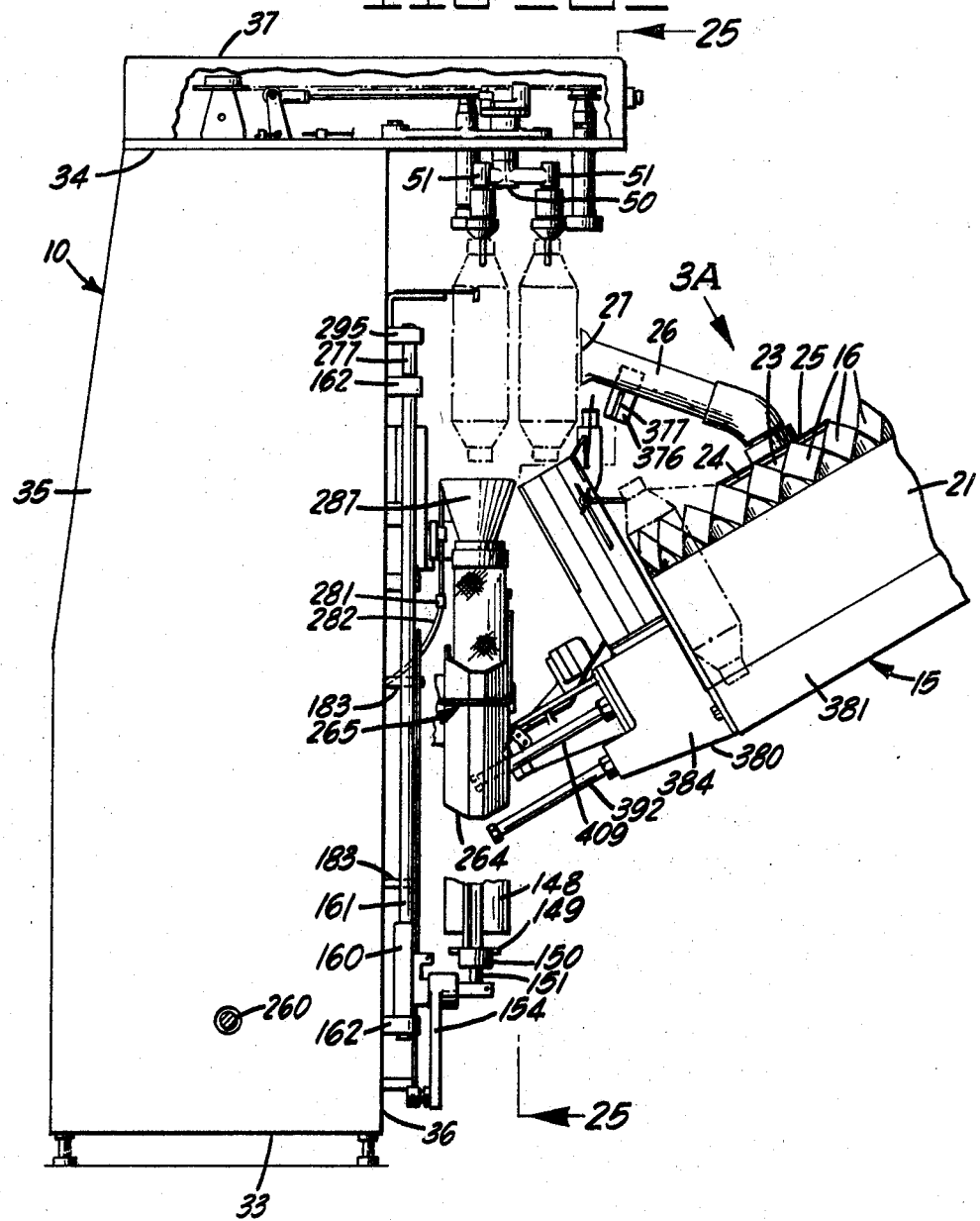

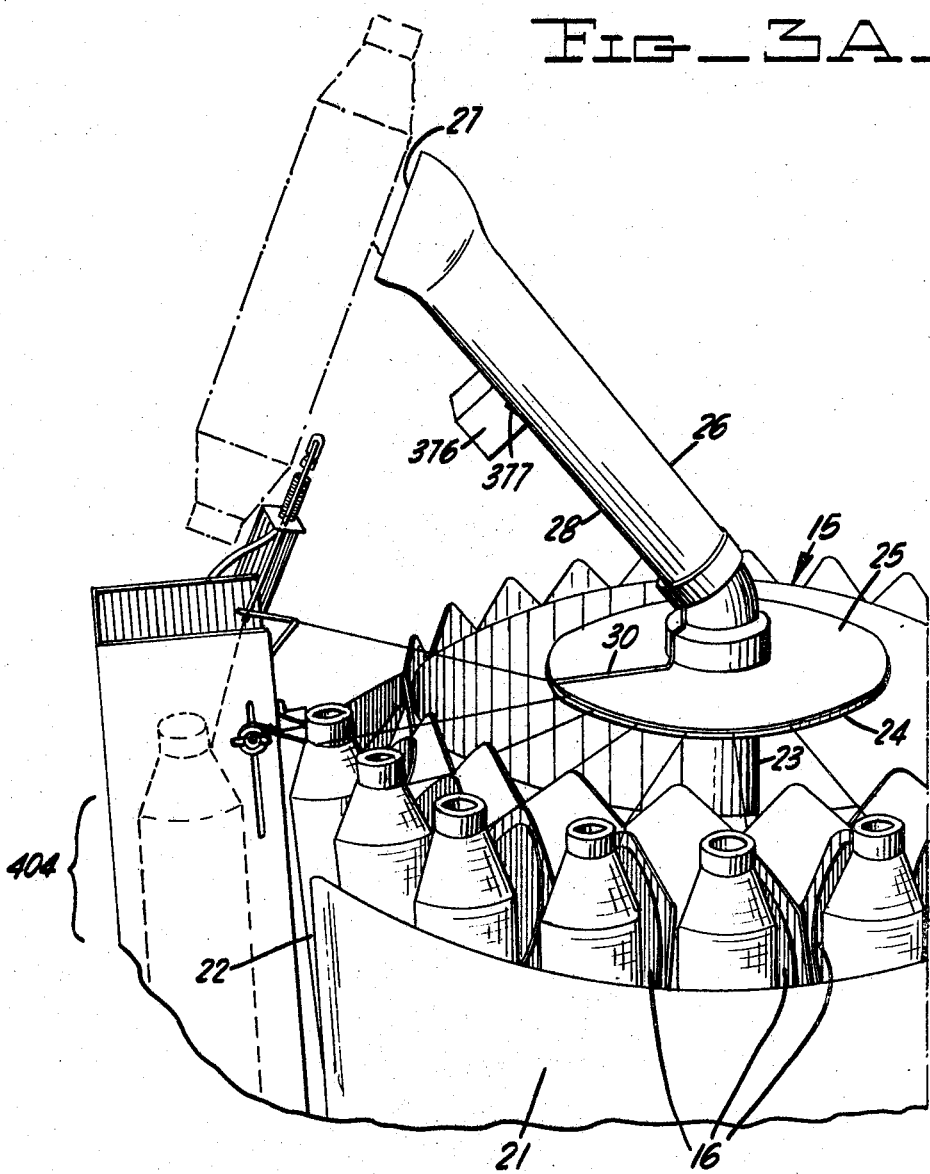

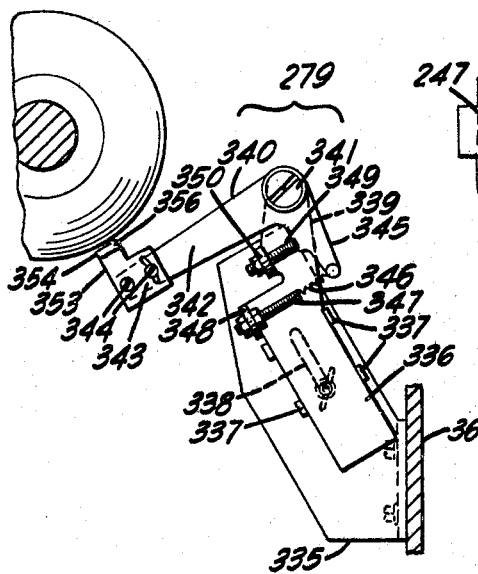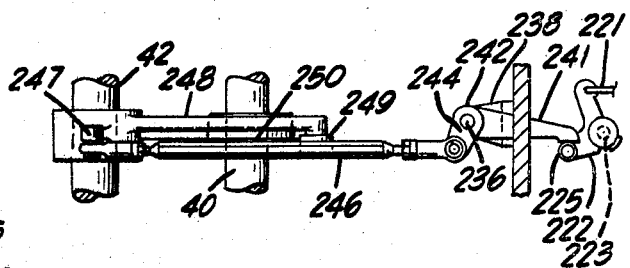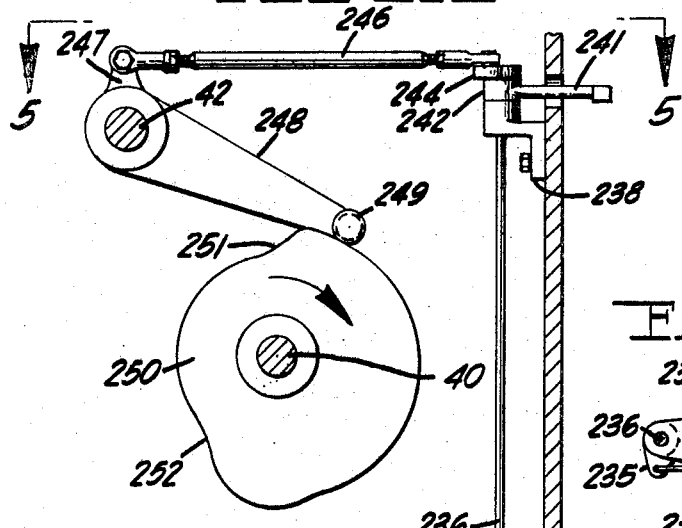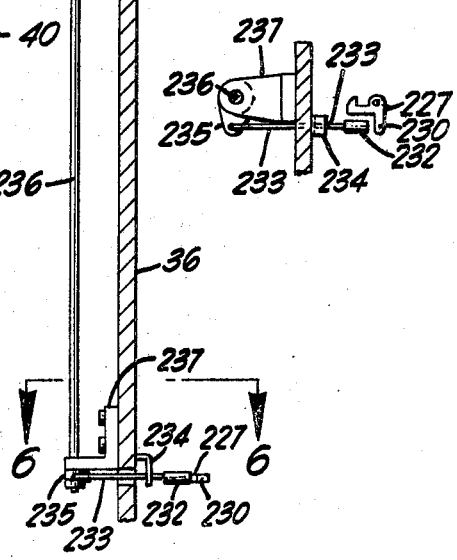

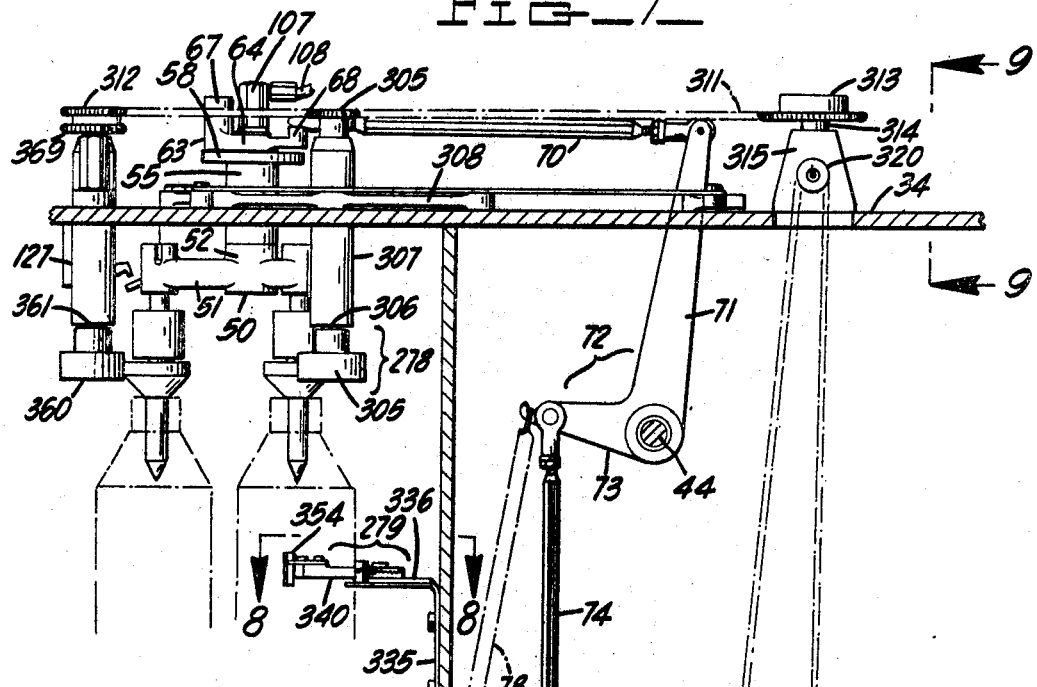
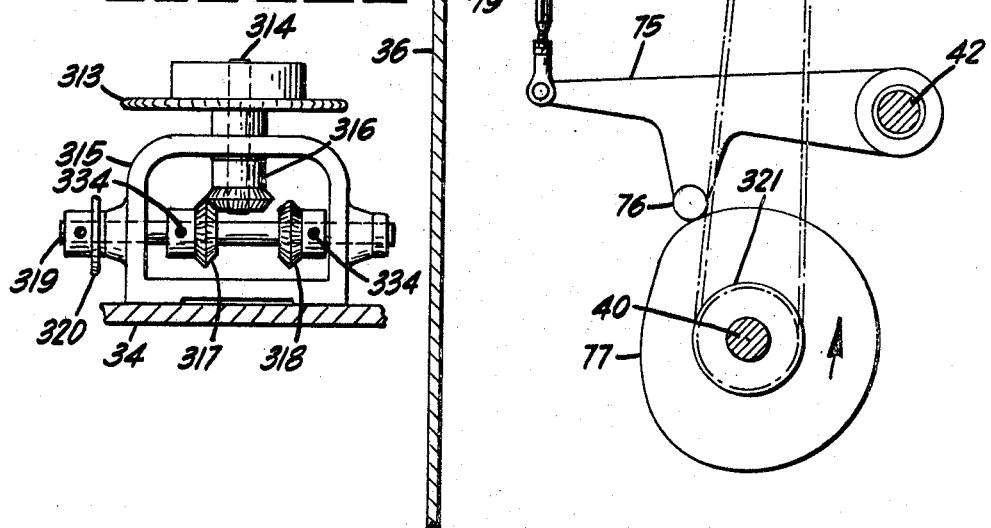

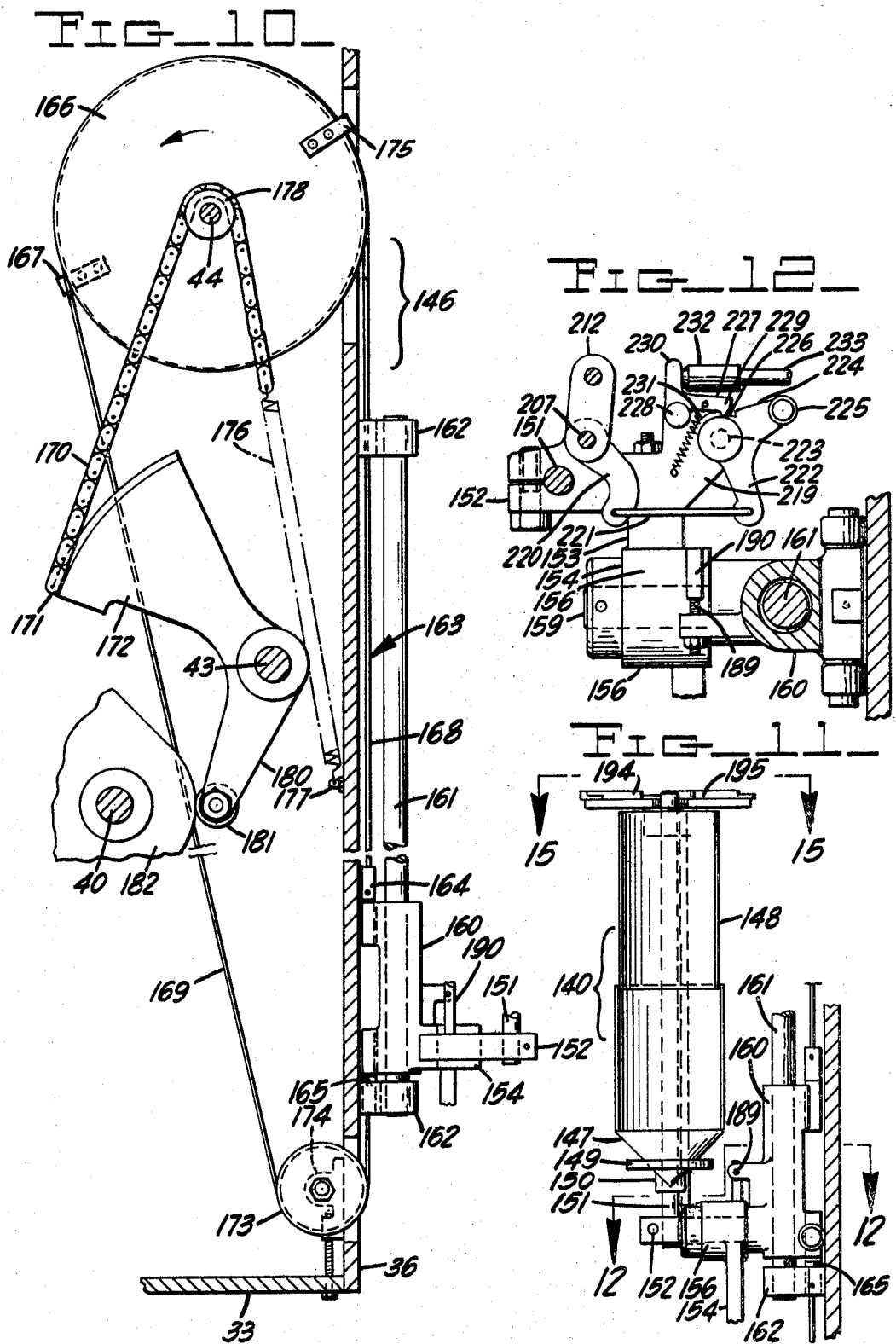

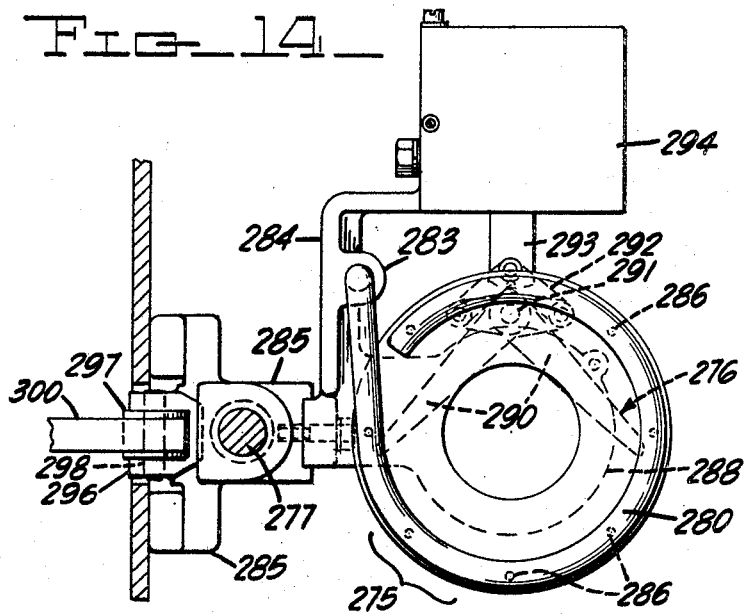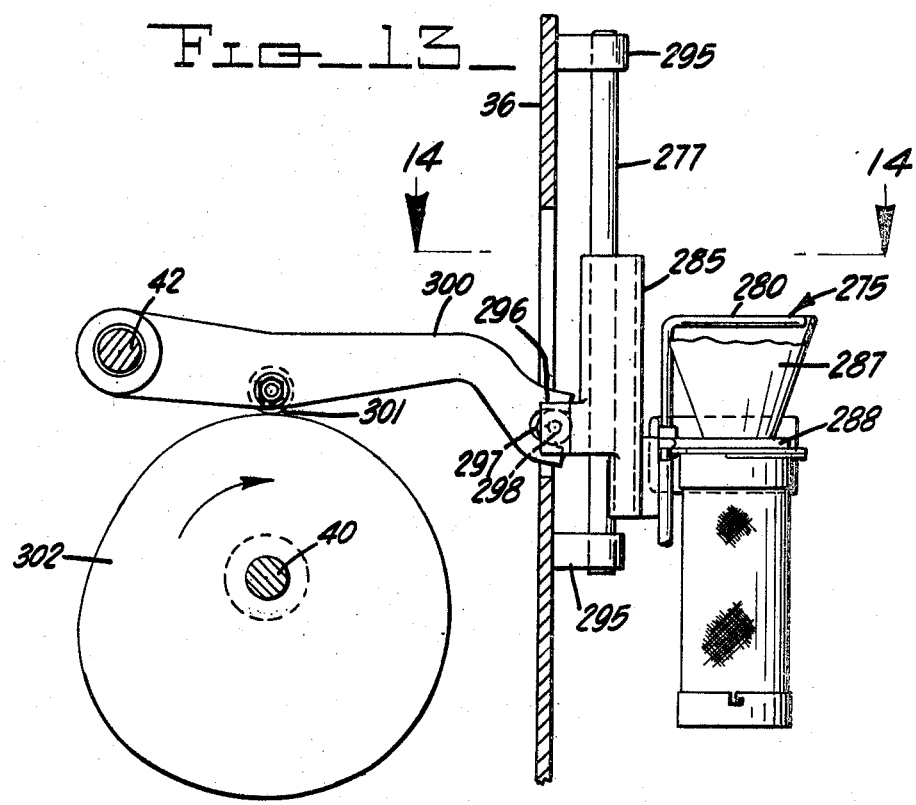

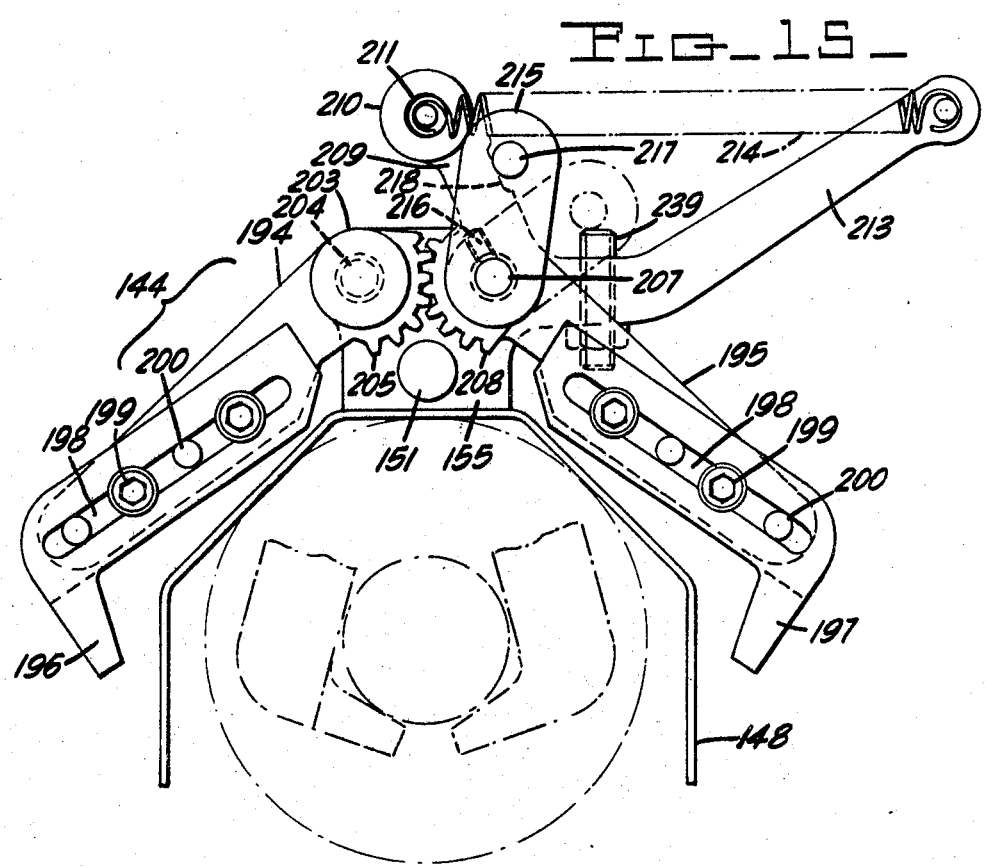

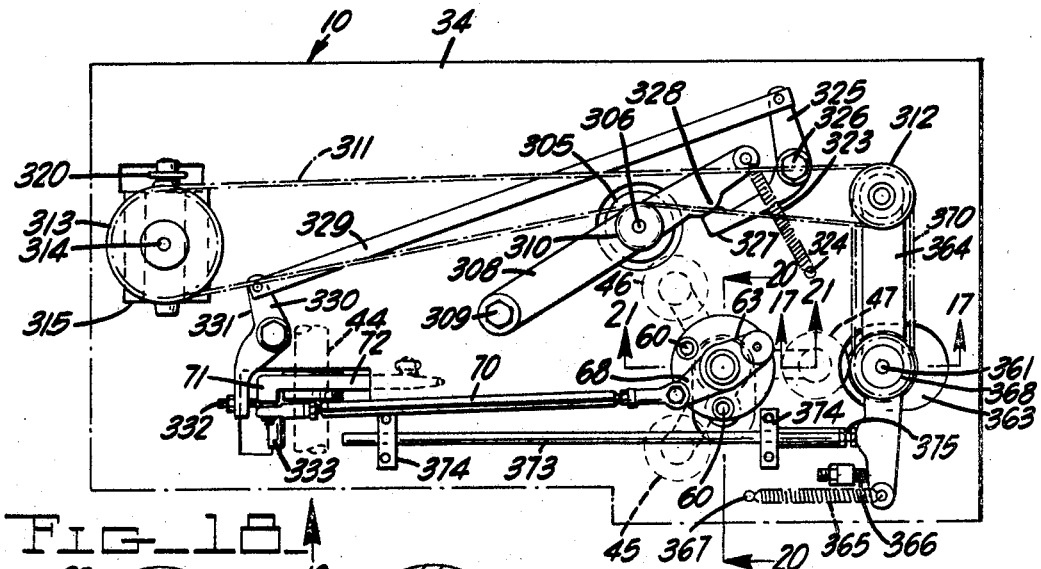
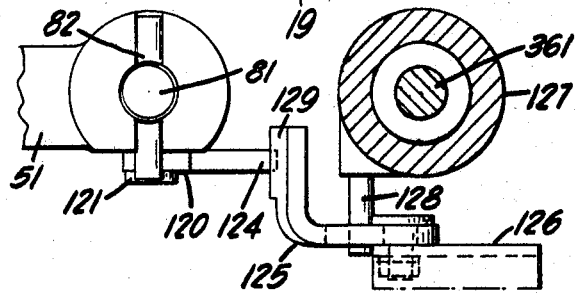
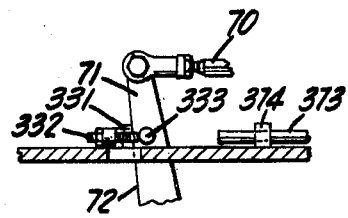
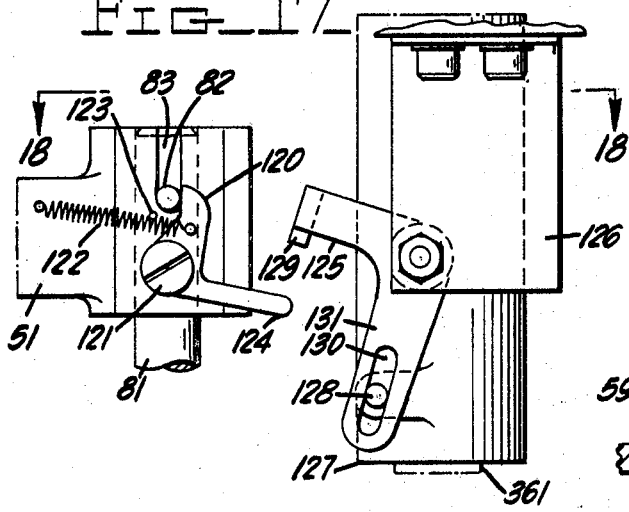
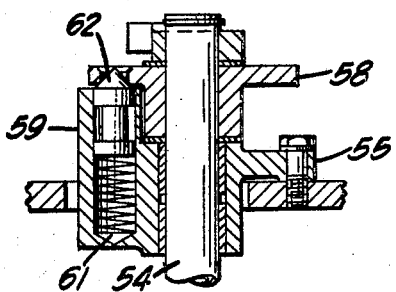

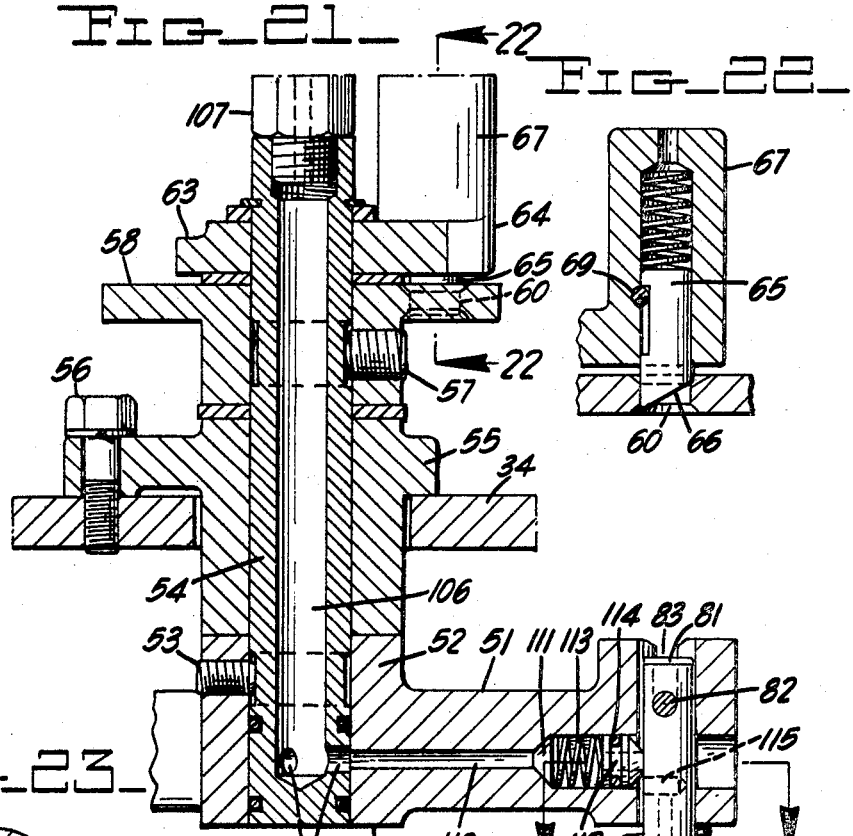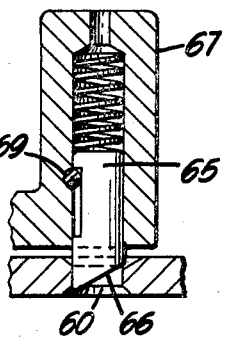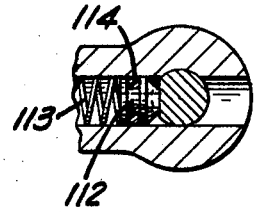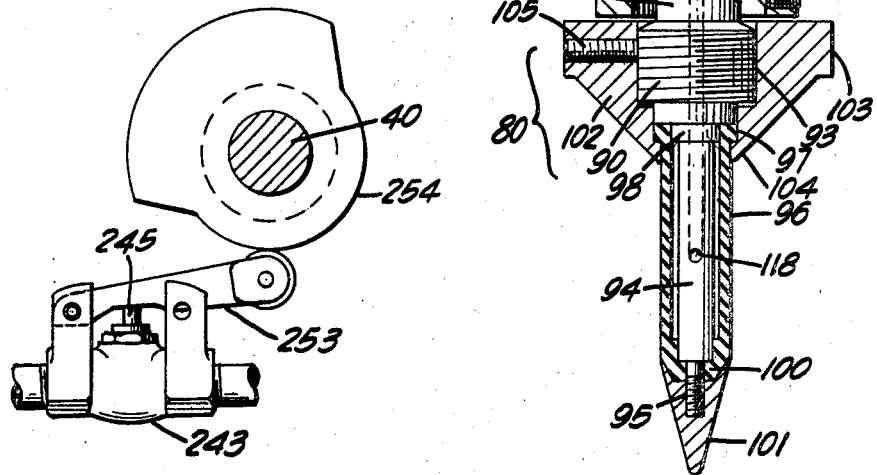

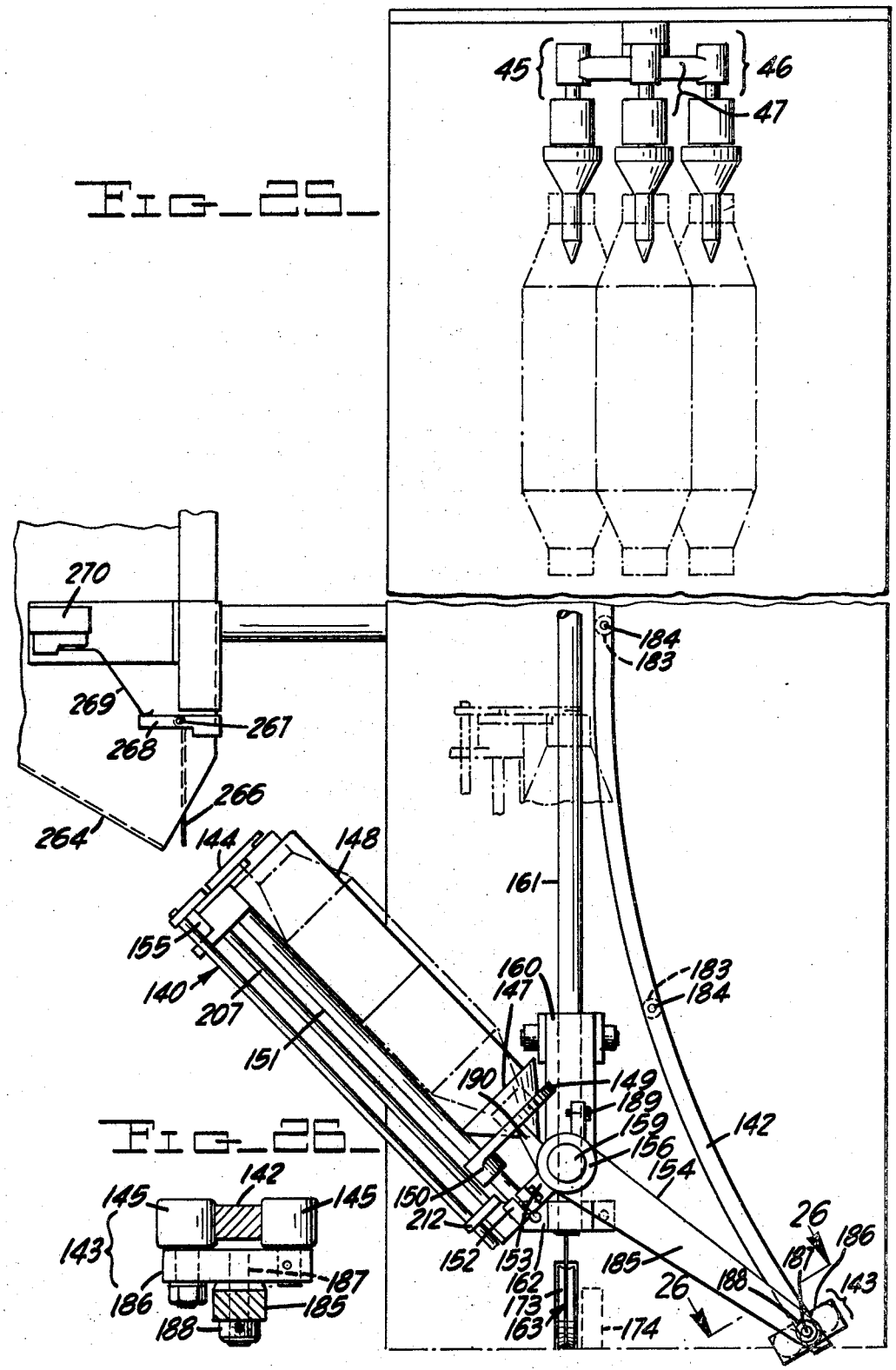

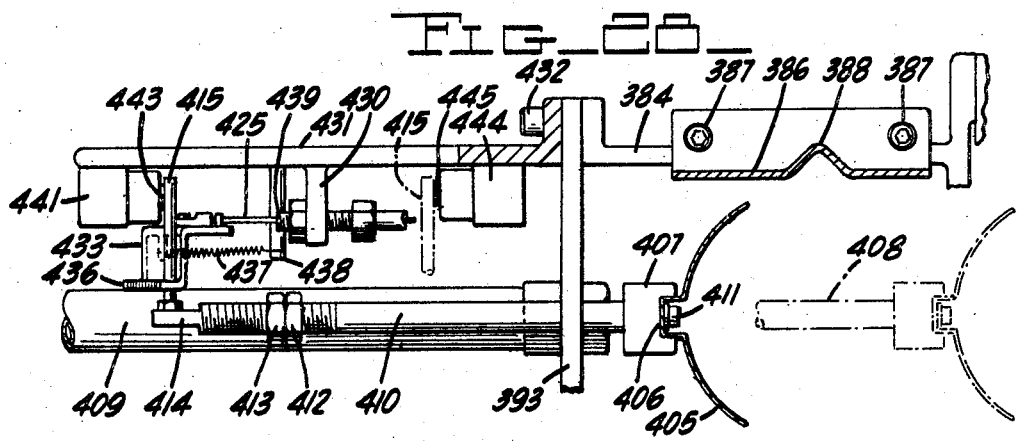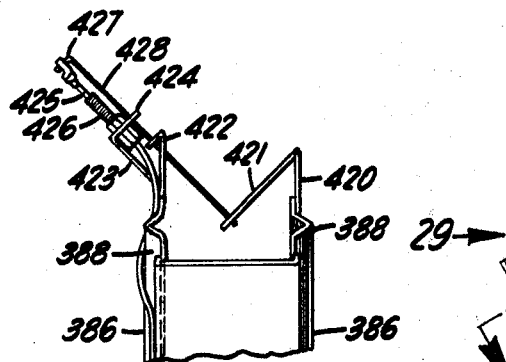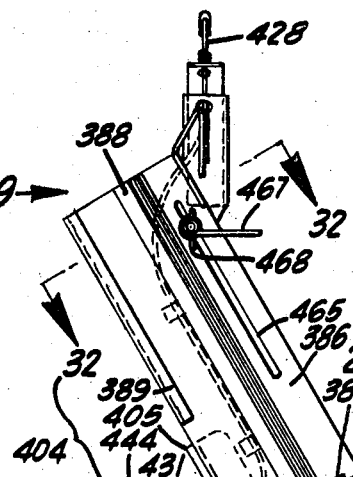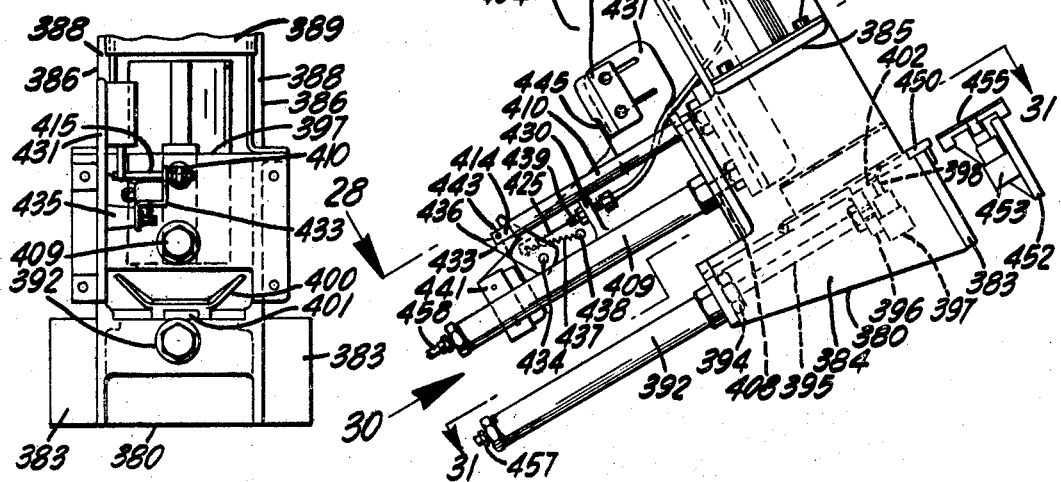

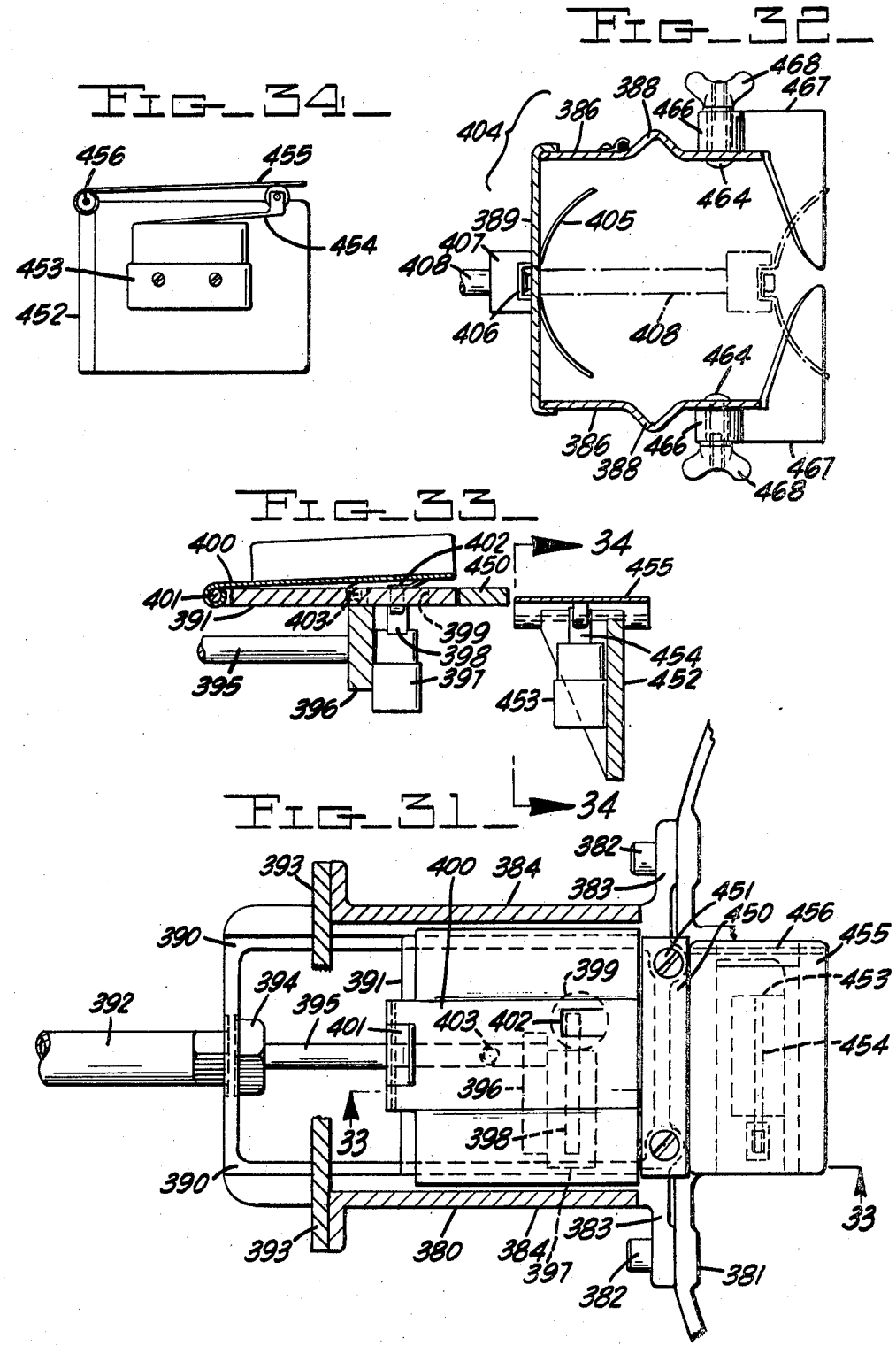

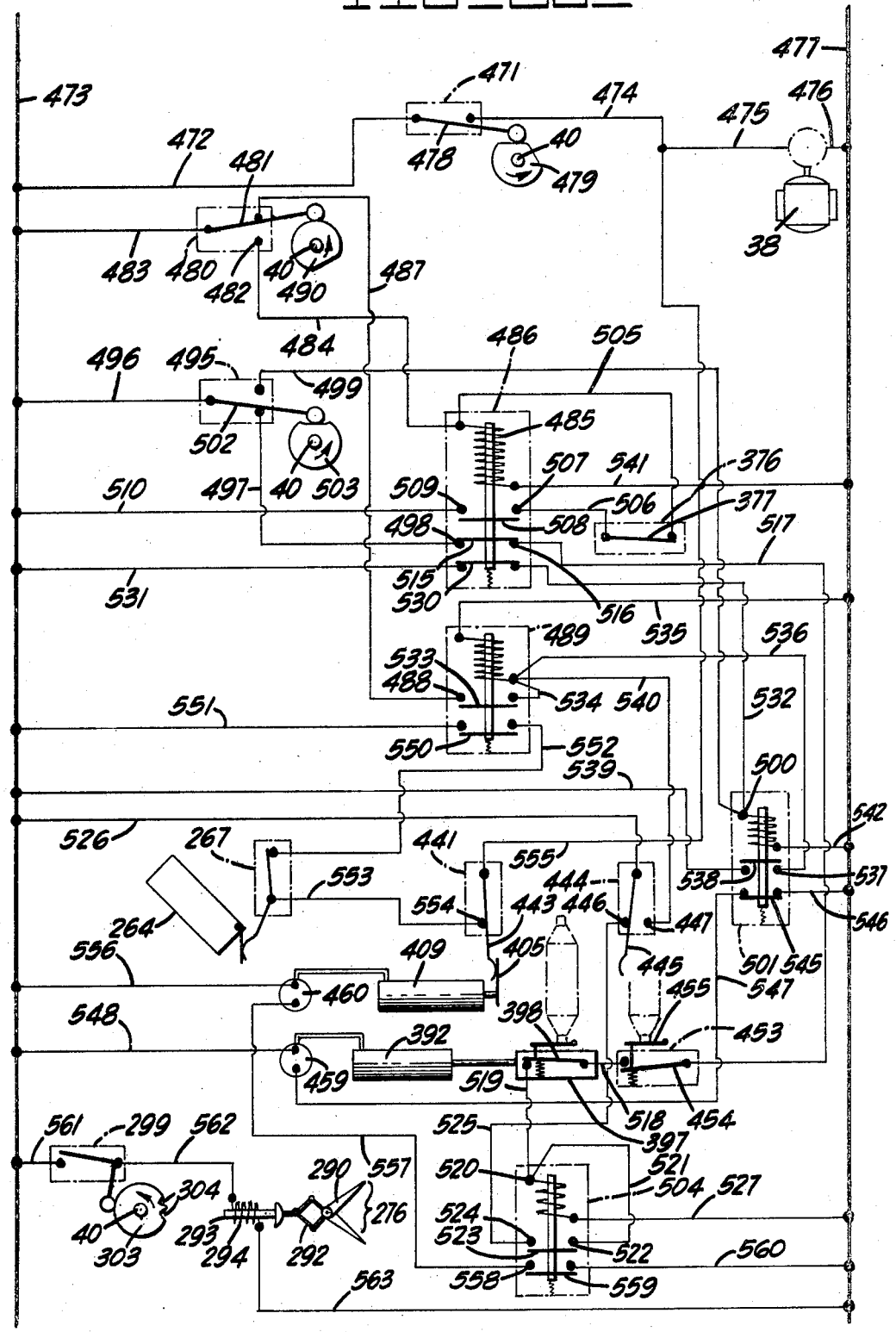

3,480,216
APPARATUS FOR PREPARING BOBBINS FOR DELIVERY TO AN AUTOMATIC WINDER
Vincent A. Iannucci, Lincoln Park, and Ronald S. Schartel, Whitfield, Pa., assignors, by mesne assignments, to North American Rockwell Corporation, Pittsburgh, Pa., a corporation of Delaware
Filed Aug. 31, 1967, Ser. No. 664,866
Int. Cl. B65h 54/24
U.S. Cl. 242—35.6                                  21 Claims

ABSTRACT OF THE DISCLOSURE

Apparatus for preparing yarn bobbins, as they are received from a spinning machine, for delivery to the bobbin magazine of an automatic winder comprising a bobbin supply hopper, means for delivering bobbins in succession from the hopper to a turret which is indexible to carry each bobbin from a first bobbin receiving station to a second or servicing station which has means to dislodge terminal ends of yarn wound thereon, means to cut off the dislodged ends, means to rotate the bobbin in a winding direction, and means operable during such movement to engage an outer spiral winding and locate a freed end thereof in position to be grasped and held by a suction nozzle at a third station. A further indexing movement of the turret carries the bobbin to the third station which, in addition to the suction nozzle, has means for rotating the bobbin in an unwinding direction whereby a length of yarn is drawn from the bobbin and into the suction nozzle, means to release the bobbin, and means to deliver the released bobbin to a receptacle adjacent the magazine of the associated winder. The receptacle contains a pusher which, upon rotation of the magazine to position an empty compartment thereof opposite the receptacle, is energized to shove the bobbin through a gate into the magazine compartment.

Background of the invention

Yarn bobbins as they are received from a spinning machine characteristically have the last wound portions of the main yarn body adjacent the upper end of the bobbin, the yarn leading therefrom in an open spiral to the base of the bobbin below the yarn body where it is wound in a few turns usually referred to as tailing windings, the yarn terminating in a tail end. A starting end of the yarn also normally protrudes from beneath the yarn body adjacent the base of the bobbin and in many cases it is found that the starting and tail ends have become entangled.

Automatic winders of the type with which the present invention is employed have servicing means which among other functions automatically replace a bobbin from which the yarn has been exhausted with a full bobbin, find the yarn end on the package and knot such end to the end leading from the full yarn bobbin which end is temporarily held in a suction type holding means. In order for the servicing means to perform these functions successfully the tailing windings must be disentangled and removed to provide a free or leading end which must be deposited in the end holding means.

Conventionally such bobbin readying operations are performed by hand, however attempts have been made to mechanize them. For example as illustrated in Patent 2,675,971, issued Apr. 20, 1954, it has been proposed to deliver bobbins, in the condition they are received from the spinning machine, to their unwinding positions on the winder and thereafter subject the bobbins to means to free the leading yarn end for delivery to the knotter of the winder. Also attempts have heretofore been made to perform such steps while the bobbins are in the magazine of a magazine type winder as illustrated in Patent 3,224,694, issued Dec. 21, 1965. However such prior attempts at mechanization involving the winder directly have not achieved the necessary reliability or have otherwise failed to meet the requirements of the industry.

It has also been proposed heretofore to employ, in connection with the magazine type of automatic winder, a separate bobbin readying unit as disclosed in the co-pending application Ser. No. 636,400, filed May 5, 1967, in the names of James D. Moyer and Richard F. Spittler and assigned to the assignee of the instant application. The bobbin readying unit described in said application comprises a turret rotatable to carry a succession of bobbins from a bobbin receiving station to a servicing station at which starting and tailing ends are disentangled and severed and thence to a yarn end finding and bobbin delivery station from which the bobbin is discharged into the magazine of the winder with its leading end found. Such prior proposed mechanism, while overcoming the disadvantages of the earlier proposals, does not have various features desirable for commercial manufacture and use of the unit.

Summary of the invention

The present invention has for its principal object the provision of a bobbin readying unit embodying the basic principles of the construction disclosed in the previously mentioned application Ser. No. 636,400 but which incorporates modifications and improvements promoting lower costs, ease of manufacture and efficiency in operation.

The foregoing and other objects of the invention, which will become apparent hereafter, are attained by the bobbin readying unit hereinafter disclosed in detail but which in essence comprises a bobbin supply device which delivers bobbins, as they are received from the spinning machine, to a bobbin elevator. The unit additionally comprises a three-armed turret indexible to move each arm in succession from a receiving station, in which a bobbin raised by the elevator is grasped by the overlying arm, to a second station at which servicing operations are performed on the bobbin by means including an air blast serving to dislodge the tailing and starting windings and to thereafter sever them, and means to engage the final spiral winding of the bobbin and elevate the end thereof to provide a positioned leading end, and to a third station where the positioned leading end is found and drawn into a suction nozzle. Also at the third station means are provided to, following the finding of the leading yarn end, release the bobbin from the turret arm to permit it to drop into a receptacle adjacent a gate in the side wall of the winder magazine the leading end in the meantime being carried to end holding means of the magazine. The device further includes a pusher element and operating means therefor which, upon the indixing of the magazine to deliver a replenishment bobbin to its undwinding position and to position an empty magazine compartment opposite the receptacle, is operated to push the bobbin from the receptacle into the empty compartment. Additionally the unit includes mechanism so controlling the operation of the several devices that upon the delivery of the bobbin from the receptacle to the winder magazine the turret is indexed to carry the bobbins held by the turret arms at the first and second stations to the second and third stations respectively for the servicing operations, the elevator is operated to raise a bobbin held therein into position to be grasped by the turret arm overlying the first station and thereafter and upon the return of the elevator to its lowered position the supply means is operated to deliver a new bobbin to the elevator. The device also includes means whereby in the event there was a failure of the suction nozzle to find and hold the leading yarn end at the third station the bobbin delivered to the receptacle at said station is rejected and the entire cycle of operation repeated.

Brief description of the drawings

FIG. 1 is a plan view disclosing the bobbin in readying unit of the instant invention in association with an automatic winder and a bobbin supply hopper;

FIG. 2 is a rear elevational view on an enlarged scale, looking in the direction of the arrow 2 of FIG. 1, of the bobbin readying unit and disclosing interior mechanisms thereof;

FIG. 3 is a side elevational view on an enlarged scale of the bobbin readying unit with the bobbin supply hopper and associated structure omitted;

FIG. 3A is a perspective view on an enlarged scale of a portion of the apparatus illustrated in FIG. 3 looking approximately in the general direction of the arrow 3A of that figure;

FIG. 4 is a sectional view on an enlarged scale taken on the line 4—4 of FIG. 2 looking in the direction indicated by the arrows;

FIG. 5 is a sectional view taken on the line 5—5 of FIG. 4 looking in the direction indicated by the arrows;

FIG. 6 is a sectional view on an enlarged scale taken on the line 6—6 of FIG. 4 looking in the direction indicated by the arrows;

FIG. 7 is a sectional view on an enlarged scale taken on the line 7—7 of FIG. 2 looking in the direction indicated by the arrows;

FIG. 8 is a sectional view on an enlarged scale taken on the line 8—8 of FIG. 7 looking in the direction indicated by the arrows;

FIG. 9 is a sectional view on an enlarged scale taken on the line 9—9 of FIG. 7 looking in the direction indicated by the arrows;

FIG. 10 is a sectional view on an enlarged scale taken on the line 10—10 of FIG. 2 looking in the direction indicated by the arrows;

FIG. 11 is a detail view of the bobbin receiving receptacle and associated structure of an elevator mechanism embodied in the instant invention;

FIG. 12 is a sectional view on an enlarged scale taken on the line 12—12 of FIG. 11 looking in the direction indicated by the arrows;

FIG. 13 is a sectional view on an enlarged scale taken on the line 13—13 of FIG. 2 looking in the direction indicated by the arrows;

FIG. 14 is a sectional view on an enlarged scale taken on the line 14—14 of FIG. 13 looking in the direction indicated by the arrows;

FIG. 15 is a sectional view on an enlarged scale taken on the line 15—15 of FIG. 11 looking in the direction indicated by the arrows;

FIG. 16 is a top plan view of a portion of the apparatus shown in FIG. 1 with the cover plate removed;

FIG. 17 is a sectional view on an enlarged scale taken on the line 17—17 of FIG. 16 looking in the direction indicated by the arrows;

FIG. 18 is a sectional view taken on the line 18—18 of FIG. 17 looking in the direction indicated by the arrows;

FIG. 19 is a detail view with parts in section looking in the direction of the arrow 19 of FIG. 16;

FIG. 20 is a sectional view on an enlarged scale taken on the line 20—20 of FIG. 16 looking in the direction indicated by the arrows;

FIG. 21 is a sectional view on an enlarged scale taken on the line 21—21 of FIG. 16 looking in the direction indicated by the arrows;

FIG. 22 is a sectional view on an enlarged scale taken on the line 22—22 of FIG. 21 looking in the direction indicated by the arrows;

FIG. 23 is a sectional view taken on the line 23—23 of FIG. 21 looking in the direction indicated by the arrows;

FIG. 24 is a sectional view on an enlarged scale taken on the line 24—24 of FIG. 2 looking in the direction indicated by the arrows;

FIG. 25 is a sectional view on an enlarged scale taken on the line 25—25 of FIG. 3 looking in the direction indicated by the arrows with parts omitted for clearness of illustration;

FIG. 25A is an elevational view on an enlarged scale looking in the direction of the arrow 25A of FIG. 1;

FIG. 26 is a sectional view on an enlarged scale taken on the line 26—26 of FIG. 25 looking in the direction indicated by the arrows;

FIG. 27 is a detail elevational view of a portion of the apparatus illustrated in FIG. 3;

FIG. 28 is a sectional view on an enlarged scale taken on the line 28—28 of FIG. 27 looking in the direction indicated by the arrows;

FIG. 29 is a detail view of a portion of the apparatus of FIG. 27 looking in the direction indicated by the arrow 29;

FIG. 30 is a detail view of a portion of the apparatus illustrated in FIG. 27 looking in the direction indicated by the arrow 30;

FIG. 31 is a sectional view on an enlarged scale taken on the line 31—31 of FIG. 27 looking in the direction indicated by the arrow;

FIG. 32 is a sectional view on an enlarged scale taken on the line 32—32 of FIG. 27 looking in the direction indicated by the arrows;

FIG. 33 is a sectional view, with parts omitted, taken on the line 33—33 of FIG. 31 looking in the direction indicated by the arrows;

FIG. 34 is a sectional view taken on the line 34—34 of FIG. 33 looking in the direction indicated by the arrows; and FIG. 35 is a wiring diagram illustrating the control means for the several mechanisms involved in the bobbin readying unit.

Description of the preferred embodiment

Referring now to the drawings and particularly to FIG. 1 the yarn readying unit of the instant invention is indicated at 10 in association with a winder indicated generally at 11. Winder 11 which is not shown in detail is, in the preferred use of the invention, an automatic winder of the traveling winder unit and stationary servicing station type. The winder includes a plurality of winder units 12 supported by suitable conveying means 13 by which the units are periodically brought to a servicing station indicated generally at 14 for bobbin replenishment when a supply bobbin is exhausted, for knotting the end of the new supply bobbin to the yarn of the package being wound and for such other servicing operations as are conventionally to be performed. The servicing station includes a rotatable magazine 15 (see FIGS. 1, 3 and 3A) comprising an annular series of bobbin compartments 16 overlying a bottom plate on which the bases of the bobbins rest, each compartment being adapted to convey a bobbin from the magazine loading position indicated at 17 in a counterclockwise direction to a position 20 at which the bobbin is delivered through an opening in the bottom plate to the bobbin holder of the winder unit. Suitably, and particularly for the purpose of association with the bobbin readying unit of the instant invention, the compartments 16 have their outer sides open to permit the bobbins to be laterally inserted therein when at the loading position 17 as will hereinafter be described. To retain the bobbins in the compartments following their insertion the compartments are surrounded by an annular fixed wall 21 having a gap or bobbin entryway 22 as best shown in FIG. 3A.

Means are provided centrally of the magazine to hold the found yarn ends of each of the bobbins carried in the compartments between the positions 17 and 20. Such means in the case of a conventional machine in which the bobbins are supplied manually to the magazine comprises suction tube 23 (see FIG. 3A) which normally terminates in an open mouth into which the yarn ends are manually placed. The withdrawal of air into the suction tube is maintained continuously during the operation of the winder by a suitable air pump having an intake side in communication with the lower end of the tube. For the purpose of associating the winder with the readying unit of the instant invention the upper end of suction tube 23 is secured to a disk 24 having a central opening in alignment with the tube. A second similar disk 25 spaced from disk 24 but secured thereto by any suitable means supports a second suction tube 26 terminating in a mouth 27 adjacent the bobbin held by the readying unit in the discharge position as will be later more fully explained. Tube 26 is also in communication with the space between the disks 24 and 25. Tube 26 is provided with a longitudinally extending slot 28 (see particularly FIGS. 1 and 3A) on the underside thereof the slot leading from the lip of the mouth to the lower end of the tube section. The slot is continued through the upper disk 25 as shown at 30, the slot 30 leading to the periphery of the disk. As will be apparent and as illustrated in FIG. 3A a yarn leading from a bobbin being transferred to the magazine and having one end drawn into the mouth 27 and thence into tube 23 may be carried along slots 28 and 30 and into the peripheral slot defined between disks 24 and 25 and after the bobbin is in the magazine will be moved along the latter as the magazine is indexed to carry the bobbins successively to position 20.

Referring now particularly to FIGS. 2, 3 and 16 the bobbin readying unit 10 is virtually independent of the winder and comprises an upright boxlike structure or cabinet fabricated from metal plates and having a base 33, an upper plate 34, side plates 35 and a front plate 36. Upper plate 34 is extended as shown particularly in FIG. 3 and has various mechanisms hereinafter to be described mounted thereon. These mechanisms may be enclosed by a cover 37. The rear of the cabinet structure may also be enclosed by a suitable cover plate (not shown) if desired.

Various operating mechanisms the charatcer and functions of which will be later described in more detail are located within the cabinet such mechanisms including a motor 38 supported on a shelf 39, a camshaft 40 carried by bearings 41 secured to side plates 35, a follower shaft 42 having its ends secured to the side plates, and lower and upper rock shafts 43 and 44 respectively both similarly mounted from the side plates. The camshaft is rotated at a relatively slow speed by motor 38 through suitable speed reduction gearing (not shown) sprocket chain 48 and sprockets 49. As previously mentioned the character and function of the various cams, cam followers, rockers, etc. will be explained in connection with the description of the various mechanisms involved in the readying unit.

Referring now particularly to FIGS. 3 and 16 the readying operations are performed by mechanisms located at three stations, namely a first or bobbin receiving station indicated generally at 45, a second or yarn end freeing station indicated generally at 46, and a third or end finding and bobbin delivery station indicated generally at 47. The construction and operation of the mechanisms at each of these stations will hereinafter be described.

The readying unit includes means for grasping a bobbin delivered to said first station and conveying or indexing it through the second and third stations. Refering particularly to FIGS. 3, 7 and 16 to 23 the bobbin conveying means comprises a turret 50 having three arms 51 spaced one hundred twenty degrees apart integrally connected to a hub 52. Hub 52 is secured as by a set screw 53 to a hollow shaft 54 mounted in a bushing 55 secured to upper plate 34 as by one or more studs 56. A circular plate 58 is fixed to hollow shaft 54 above bushing 55 as by a set screw 57 penetrating a hub portion thereof. The circular plate has three apertures 60 spaced one hundred twenty degrees apart and equidistant from the center line of the shaft, the apertures being chamfered at both ends as illustarted. Bushing 55 includes an extension 59 having a recess 61 equidistant from the center line of the shaft to apertures 60 (see particularly FIGS. 16 and 20) the recess receiving an upwardly spring pressed detent 62 having a conical nose adapted to enter each aperture 60 and resist further rotation of the turret when plate 58 is rotated to align the detent and such aperture.

Also mounted on hollow shaft 54 for rotation thereon is a double-armed lever 63 one arm 64 thereof having an upwardly projecting nob 67 recessed to receive a spring pressed detent 65 the recess being equidistant from the center line of the shaft to apertures 60. Referring particularly to FIG. 22 it will be noted that the end of detent 65 is tapered as at 66 the direction of the taper being such that upon rotation of arm 64 in one direction, namely in a clockwise direction as viewed in FIG. 16, it will interlock in the aperture to carry plate 58 with it and in the other direction of rotation will withdraw or be cammed from the aperture. A flat on the detent in association with a pin 69 prevents the detent from rotating from the above described position.

Referring now particularly to FIGS. 7 and 16 the other arm 68 of lever 63 is pivotally connected to one end of a link 70 the other end of which is pivotally connected to one arm 71 of a bell crank 72 mounted for rocking movement on shaft 44 within the cabinet, the arm extending through an aperture in plate 34. The other arm 73 of bell crank 72 is pivotally connected to one end of a link 74 the opposite end of the link being pivotally connected to the end of a follower lever 75 pivotally mounted on follower shaft 42. Follower 75 includes a follower roller 76 riding on the rim of a cam 77 fixed to camshaft 40. A tension spring 78 has one end connected to the outer end of arm 73 of lever 72 and its other end connected to a pin 79 projecting from the cabinet wall 36 the spring urging the lever 72 to rotate in a counterclockwise direction as viewed in FIG. 7.

When the cam follower 76 is on the high portion of the cam, as illustrated in FIG. 7, lever 63 will be in the position illustrated in FIG. 16 with detent 65 carried by lever arm 64 within the aperture 60 in the two o'clock position as viewed in FIG. 22. Also holding detent 62 carried by bushing 55 will have entered the aperture at the six o'clock position as viewed in FIG. 16. Upon continued rotation of cam 77 in a counterclockwise direction as viewed in FIG. 7 follower 76 rides onto the downward slope of the cam profile permitting spring 78 to rotate lever 63 in a counterclockwise direction, the cam profile being such that detent 65 is finally positioned to overlie and enter the third aperture, namely the one at the ten o'clock position as viewed in FIG. 16 the holding force of detent 65 being overcome and the detent cammed out of the aperture with which it was associated during the first part of this movement and entering the next aperture upon the completion of such movement. Upon further continued rotation of cam 77 follower 76 rides the upward slope of the cam profile rotating lever 63 in a clockwise direction and, due to the penetration of detent 65 in the aforementioned aperture, causing positive rotation of plate 58, the holding action of detent 62 being overcome and the detent cammed out of its holding position during such movement. The cam profile is such that rotation of lever 63 continues until the lever is again in the position illustrated in FIG. 16 the parts remaining in this position during the period that the follower is on the high portion of the cam. Hence it will be understood that upon each rotation of cam 77 the turret is indexed through one hundred twenty degrees to successively move each arm thereof to each of the three stations, the arms remaining stationary during the period that the cam follower is on the high portion of the cam.

Referring again particularly to FIG. 21 each turrent arm 51 at its outer end supports a bobbin holding device indicated generally at 80. The bobbin holder comprises a downwardly projecting rod 81 slidably received in an aperture of the arm. A transverse pin 82 extends through a perforation in the rod and has its ends received in notches 83 of the arm whereby rotation of the rod relatively to its associated arm is prevented and the extent of downward movement of the rod is determined. At its lower end rod 81 is threaded into a block 84 and a spring 85 surrounds rod 81 between the arm and the block urging the block and rod toward their lowest positions as determined by pin 82. A double bearing 86 is mounted within a hollow recess 87 of the block the bearing rotatably supporting a reduced portion 88 of a downwardly projecting spindle 90. The inner race of the bearing is confined between shoulders defined by an enlarged portion 91 thereof and a snap ring 92 and the outer race is confined between a set screw 89 and a shoulder 99. Spindle 90 includes an intermediate threaded hub portion 93 and a stem 94 of reduced diameter projecting downwardly therefrom, stem 94 terminating in a threaded pin 95. A tubular inflatable element 96 of flexible expandable material such as natural or synthetic rubber includes an upper rim portion 97 fitting over an enlarged portion 98 of the stem and a lower end wall 100, pin 95 extending through an opening in the wall 100. A conical member 101 threaded on pin 95 maintains the lower end of inflatable element 96 in position and also defines a pointed end for the pin to aid in its insertion into a bobbin bore. A nut 102 threaded onto hub portion 93 includes a knurled annular surface 103 for driven contact with a drive roll later described for rotation of the bobbin holder. The nut also has an annular flange 104 securing an upper rim portion of element 96 in position on the stem. Nut 102 is held against rotation relatively to the hub portion by a set screw 105.

As previously mentioned shaft 54 is hollow having an internal bore 106 including an upper socket portion into which is threaded a rotary air fitting 107 of any usual or conventional type. As shown best in FIG. 7 the rotary air fitting is connected by an air line 108 to any suitable continuous source of air under pressure. Bore 106 of shaft 54 includes lateral outlets 109, one for each arm, and each in alignment with a bore 110 extending longitudinally of the arm. Each bore 110 includes an enlarged section 111 adjacent rod 81. The enlarged portion 111 of the bore contains a nozzle element 112 urged to maintain its forward end in contact with a flat on rod 81 by compression spring 113 (see FIGS. 21 and 23). An O packing ring 114 is suitably positioned in a groove in the nozzle member to resist the passage of air except through the opening of the nozzle.

Rod 81 is provided with a transverse bore 115 extending partially through the diameter thereof the bore having an open mouth adapted in an upper position of rod 81 to be in alignment with the mouth of nozzle 112. A second bore 116 in communication with bore 115 extends longitudinally of rod 81 to the lower end thereof. A similar bore 117 in alignment with bore 116 extends longitudinally of spindle 90 to a transverse bore 118 extending diametrically through stem 94 and opening at both ends into the space between the spindle and inflatable element 96.

As will be understood from the above description air supplied under pressure through air line 108 flows through the hollow interior of shaft 54 and the bores in the arms 51. When a bobbin holder is in its raised position to align bore 115 with nozzle 112 the air flow continues through the aligned bores in rod 81 and spindle 90 and issues through transverse bore 118 to inflate element 96. The inflatable elements in their uninflated condition are each adapted to be received in the central bore of a bobbin and when inflated to expand and hold the bobbin thereon. The inflation of the tubular element takes place upon upward movement of the bobbin holder to bring bore 115 into alignment with nozzle 112 as previously mentioned. Such upward movement against the action of spring 85 is performed during the loading operation of the bobbin onto the holder as will be later explained.

Referring particularly to FIG. 17 the end of each arm 51 carries a latch 120 mounted on a pin 121 and urged to rotate in a counterclockwise direction, as viewed in FIG. 17, by a tension spring 122 into contact with a stop pin 123. The latch is positioned to underlie a projecting extension of pin 82 when the bobbin is in its raised position and hence maintain it in that position until the latch is released. A tail 124 of the latch projects to a position to be contacted by a latch release member 125 pivotally mounted on a bracket 126 secured to the upper plate 34 of the cabinet. Latch release 125 includes an arm 129 adapted to stirke tail 124 when the release member is rotated in a counterclockwise direction. Rotation of the latch release is under the control of a sleeve 127 carrying a pin 128 projecting through an inclined slot 130 in a second arm 131 of the latch release. Thus it will be understood that upon movement of sleeve 127 to the right as viewed in FIG. 18, such movement taking place at certain times as will be hereinafter explained, arm 131 will strike tail 124 rotating latch member 120 from beneath pin 82 permitting the bobbin holder to drop to the extent permitted by notch 83 under the influence of spring 85 and the weight of the bobbin holder and bobbin thereon. Consequently upon downward movement of the bobbin holder the alignment of bore 115 with nozzle 112 will be disrupted cutting off the supply of air under pressure to inflatable element 96 and, due to normal air leakage in the system, immediate deflation of the tubular element and the release of a bobbin carried thereby will result.

Referring now particularly to FIGS. 1, 3, 10 to 12, 15, 25 and 26 the construction and operation of the mechanisms at the first or bobbin receiving or loading station indicated generally at 45 (see FIG. 16) will be described. The mechanisms at this station comprise elevator means for receiving a fresh bobbin from a supply thereof and elevating it to a position in which the inflatable element 96 of the bobbin holding device 80 overlying the station enters the internal bore of the bobbin and from thence to a position in which the bore 115 of the bobbin holding member is brought into alignment with nozzle 112 to cause inflation of the inflatable member as previously described and latch 120 is permitted to rotate, under the action of spring 122, to underlie the projecting end of pin 82. The elevator means includes a tray 140 mounted for rocking movement between an inclined bobbin receiving position and a vertical bobbin delivery position, means for rocking the tray between said positions comprising a cam 142 and follower means 143, means indicated generally at 144 for grasping the upper end of the bobbin and holding it in fixed position in the tray, means for moving said grasping means between bobbin grasping and bobbin releasing positions and means indicated generally at 146 (FIG. 10) for moving said bobbin receiving tray between a lowered bobbin receiving position and an upper position in which it delivers a bobbin to the bobbin holder as aforesaid.

The bobbin tray 140, best illustrated in FIGS. 3, 11 and 25, includes a conical lower section 147 and a trough-like body portion 148 made up of upper and lower sections with the upper section slidably received in the lower section whereby the length of the tray may be adjusted for bobbins of different lengths. Conical section 147 is rigidly secured to the lower section of body portion 148 and is received in and supported by a ring 149 having a hub 150 secured in any suitable manner and in fixed relationship to a rod 151. The lower end of rod 151 is received in a clamp 152 projecting from a short arm 153 of a follower lever indicated generally at 154. The upper section of the tray body portion is rigidly secured in any suitable way to a block 155 adjustably carried by the upper end or rod 151. Lever 154 includes a hub portion 156 mounted for rocking movement on a stub shaft 159 carried by a slider 160. Slider 160 is mounted for sliding movement on a rod 161 the rod being supported in spaced relationship from the front wall of the cabinet by brackets 162. The slider 160 is moved between its lowered and elevated positions by means of a cable 163. Suitably the cable is in two section one section 168 having one end secured to slider 160 as at 164 and its other end extending around a grooved pulley 166 on shaft 44 and attached to the pulley as at 167. The other cable section 169 has one end connected to the slider as at 165 and then extends around a sheave 173 mounted forrotation on a pin carried by bracket 174 which in turn is adjustably mounted from the cabinet. Cable section 169 continues around pulley 166 in the opposite direction to the first section and has its other end secured to the pulley as at 175. Pulley 166 carries a sprocket 178 over which is passed a sprocket chain 170 one end of the chain being connected as at 171 to one arm of a rocker device 172 mounted on shaft 43. The other end of the sprocket chain is connected to one end of a spring 176, the other end of which is secured to a pin 177 projecting from the front plate of the cabinet. Rocker device 172 has a second arm 180 carrying a follower roller 181 adapted to ride upon the periphery of a cam 182 mounted for rotation with camshaft 40. The profile of cam 182 is such that upon each complete rotation of the camshaft rocker device 172 is rocked to in turn cause pulley 166 to oscillate cable 163 to shift slider 160 on rod 161 from the lowered position shown in FIG. 10 to an elevated position and thence back to its lowered position.

Referring particularly to FIG. 25 the mechanism for rocking tray 140 between the inclined position shown in that figure and an upright position comprises the cam 142 and follower 143 previously referred to. More specifically the cam is in the form of a rail supported in spaced relationship from the front wall of the cabinet by posts 183 to which the rail is secured as by screws 184 (see FIGS. 3 and 25). An arm 185 of the lever 154 carries the follower rollers 145 the mounting means for the latter (see FIG. 26) comprising a crossarm 186 mounted on a pivot pin 187 which in turn is mounted for rocking movement in a bearing adjacent the end of lever arm 185, the pin and crossarm being held in assembled relationship by a collar 188. The contour of cam track 142 is such that as the elevator rises tray 140 is rocked from the inclined position illustrated in FIG. 25 to a fully vertical position before a bobbin carried thereby reaches the bobbin holding device 80. The precise upright position of the tray is determined by an adjustment screw 189 carried by slider 160 contacting an abutment 190 projecting from hub portion 156 (see FIG. 12).

The means 144 to center and hold an upper end of a bobbin received in tray 140 comprises (see particularly FIGS. 4, 11, 12 and 15) a pair of arms 194 and 195 each arm having a hooked jaw extension 196 and 197, respectively, mounted thereon for longitudinal adjustment whereby bobbins of different sizes may be accommodated. The adjustment means for each jaw comprises a longitudinal slot 198 in the jaw and headed studs 199 penetrating the slot and received in threaded openings in the arms, the studs serving to secure the jaws in their adjusted positions. The arms may also carry positioning studs 200 projecting into the slots.

Arm 194 includes a hub portion 203 mounted for rotation on a pin 204 projecting upwardly from block 155 and received in a downwardly opening recess of the hub. The hub is provided with a toothed segment 205. Arm 195 is similarly mounted for rotation on a rod 207 the rod extending downwardly through a bearing opening in block 155 to a bearing opening in an extension of lever arm 153 in which it is rotatably received. A hub portion of arm 195 has a toothed segment 208 in mesh with toothed segment 205 whereby rotation of one of the arms causes rotation of the other but in the opposite direction. A rearwardly projecting extension 209 of arm 195 carries a boss 210 having an opening receiving the upper end of a rod 211 the lower end of which is supported in an outer end of a link 212. The inner end of the link is penetrated by and affixed in any suitable way to rod 207 for rocking movement therewith (see FIGURE 12). Referring again to FIG. 15 block 155 includes an integral arm 213, a tension spring 214 being secured in any suitable way to the outer end of arm 213 and to an extending end of rod 211 whereby arm 195 is urged to rotate in a clockwise direction and, due to the intermeshing gear segments, arm 194 is urged to rotate in a counterclockwise direction to rotate the jaws from their open position illustrated in full lines in FIG. 15 to their closed position illustrated in dot-and-dash lines in that figure. A short lever arm 215 is mounted on the end of rod 207 and is secured thereto for rotation therewith as by the set screw 216. The outer end of lever arm 215 carries a downwardly projecting pin 217 adapted to contact a recessed portion 218 of stub 209.

Referring now particularly to FIG. 12 an arm 220 having one end affixed to rod 207 in any suitable manner for rotation therewith is connected by a link 221 to one arm of a two-armed lever 222 mounted for rotation on a pin 223 projecting upwardly from an extension 219 of lever arm 153 and received in a recess in a hub portion of the two-armed lever. A second arm 224 of the two-armed lever has a roller 225 mounted on a pin projecting upwardly adjacent the outer end of the arm and is provided with a notch 226. A latch lever 227 is mounted for rotation on a pin 228 projecting upwardly from extension 219 the latch lever including a nose 229 adapted to be received in notch 226 and an outwardly projecting arm 230. Latch lever 227 is urged in a direction to maintain nose 229 in notch 226 by a tension spring 231 having one end secured to the latch lever and its other end secured to extension 219.

As will be understood from the foregoing description, with the parts in the positions illustrated in FIGS. 12 and 15 the tendency of spring 214 to rotate arms 194 and 195 and hence jaws 196 and 197 to their closed position is prevented by the interposition of nose 229 of latch lever 227 within notch 226. That is, inasmuch as double-armed lever 222 is held against rotation in a clockwise direction by the latch arm 220 connected therewith by link 221, rod 207 and arm 215 are similarly prevented from rotating in a clockwise direction, Hence pin 217 maintains arm 195 in the position shown against the tension of spring 214.

In order to release latch 227 at certain times to permit spring 214 to close jaws 196 and 197 against the upper end of a bobbin and at other times to return said jaws and their supporting arms to the positions illustrated in FIG. 15 for retention by latch 227 means are provided to perform these functions as best illustrated in FIGS. 4 to 6 and 12. The latch release means comprises a plunger 232 positioned to lie opposite the arm 230 of the latch lever 227 when the elevator is in its lowered position. Plunger 232 is carried by a rod 233 the rod penetrating an opening in a bracket 234 secured to the front plate 36 as well as an aperture in the front plate. The rod has an inner bent end penetrating an opening in a lever arm 235 having a hub portion secured to one end of a rod 236 for rotation therewith. Rod 236 is supported for rotation in brackets 237 and 238 projecting inwardly from front plate 36. As will be understood with the elevator in its lowered position upon rotation of rod 236 in a counterclockwise direction as viewed in FIG. 6 plunger 232 will strike arm 230 of latch 227 to rotate the latch and remove nose 229 from notch 226 permitting rotation of lever 222 in a clockwise direction to the extent permitted by a stop 239 (see FIG. 15) said stop comprising a stud threaded into arm 213 and positioned to be contacted by pin 217.

The means for rotating lever 222 in a counterclockwise direction to reset the latch is located at an upper level and in position to operate on lever 222 when the elevator approaches its uppermost position and spindle 90 of the bobbin holder has started to enter the bore of the bobbin carried by the elevator. This means comprises a lever arm 241 having an integral hub portion 242 secured to rod 236 (see FIGS. 4 and 5) for rotation therewith. Lever arm 241 in an inactive position thereof lies opposite roller 225 of lever 222 when the latter has been rotated to its clockwise position upon release of latch 227.

A lever arm 244 has an inner end secured to rod 236 and an outer end pivotally connected to one end of a link 246 the other end of which is pivotally connected to an arm 247 of a follower lever 248 mounted for rocking movement on follower shaft 42. Follower lever 248 carries a follower roller 249 adapted to ride on the rim of a cam 250 fixed to camshaft 40 for rotation therewith. As will be noted the profile of cam 250 is such that as the cam rotates in a clockwise direction from the position illustrated in FIG. 4 follower roller 249 will ride down an inclined portion 251 whereby rod 236 will be rotated in a counterclockwise direction as illustrated in FIG. 6, this in turn causing plunger 232 to advance to release latch 227. At the same time that plunger 232 is advanced as aforesaid lever 241 will be rotated in a counterclockwise direction to position it for later operation. As the cam continues to rotate the parts will remain in this position until roller 249 starts up riser 252. Upon continued movement of the follower roller rod 236 will be rotated in a clockwise direction causing similar clockwise rotation of lever 241 with the result that, assuming the elevator is in its raised position in which roller 225 of lever 222 is opposite lever 241, lever 222 will be rotated in a counterclockwise direction as viewed in FIGS. 5 and 12. The height of the riser 252 is such that such rotation will continue until the nose of latch 227 again enters notch 226. During such rotation of lever 241 plunger 232 will be withdrawn past its normally inactive position but as follower roller rides down the other side of riser 252 rod 236 will be rotated in a counterclockwise direction to restore the plunger to its normal inactive position.

Referring particularly to FIGS. 25 and 25A the bobbins are supplied to the tray of the elevator from a bobbin bin 255 by means which preferably comprises an inclined conveyor defining a forward wall of the bin and including a continuous succession of buckets 256 carried by a pair of endless chains 257. The chains are mounted on sprockets 258 secured to upper and lower shafts 259 and 260, respectively, mounted for rotation in bearings in the frame members of the conveyor unit. Shaft 260 is extended and projects through the side wall 35 of the cabinet the inner end of the shaft carrying a sprocket 261 (FIG. 2). Sprocket 261 is driven by a sprocket chain 262 from a sprocket 263 fixed to camshaft 40 for rotation therewith. The relative size of the sprockets 261 and 263 are such that upon the completion of one rotation of the camshaft in a cycle of operation of the readying unit the bobbin conveyor will be advanced sufficiently to move one bucket thereof from a bobbins retaining to a bobbin discharging position. The bobbins are discharged into a chute 264 mounted on a bracket 265 secured to the framework of the conveyor unit. Chute 264 terminates adjacent the upper end of tray 140 when the latter is in its inclined bobbin in receiving position as illustrated in FIG. 25. A feeler 266 is suspended in the mouth of the chute from a shaft 267 to which it is fixed, the ends of the shaft being rotatably supported in the chute walls. One end of the shaft is extended through a chute wall and has piece 268 secured thereto for rotation therewith. One end of piece 268 underlies an actuator arm 269 of a normally open microswitch 270. The other end of piece 268 is weighted whereby the piece normally maintains the switch closed. However the switch is permitted to open upon rotation of the feeler in a counterclockwise direction by a bobbin during its discharge from the chute. The function of the microswitch and associated mechanism is to interrupt the operation of the readying unit in the event a bobbin becomes stuck in chute 264. The relationship of the micro-switch to other elements of the electrical system will become apparent hereafter.

Reference will now be made particularly to FIGS. 3, 7, 8, 13 and 14 which disclose the construction and operation of the mechanisms at the second or yarn end freeing station 46. These mechanisms, briefly mentioned and which will hereinafter be described in detail, include (see particularly FIG. 14) an air jet means 275 and a cutter mechanism 276 underlying the bobbin holder positioned at the second station and carried by a bracket which in turn is mounted for vertical movement on a slide 277 whereby it may be elevated from a lower inactive position to an upper active position, means indicated generally at 278 (see particularly FIG. 7) for rotating the spindle of the bobbin holding member and the bobbin held thereby at a certain times in a bobbin winding direction and mechanism illustrated generally at 279 for elevating a yarn end of the outer spiral winding of a bobbin to position it for further operations.

The air jet means 275 comprises a tube 280 connected through a suitable fitting 281 to a flexible hose 282 which in turn is connected to any suitable source of air under pressure through a conduit including a valve 243 (see FIGS. 2 and 24). Valve 243 includes a stem 245 adapted to be depressed against the action of a spring (not shown) to close the valve by a pivoted follower lever 253 having a roller riding on the rim of a cam 254 carried by camshaft 40. Adjacent its upper end the tube is secured in any suitable way to a lug 283 projecting from a bracket 284 carried by a slider 285 mounted on slide 277. The air tube 280 terminates in a horizontal portion formed into a substantially closed ring as shown in FIG. 14 the end of the tube being plugged. The ring is provided with a series of air jet openings 286 positioned to direct streams of air downwardly and inwardly toward a common point. A funnel 287 has its lower end supported in a circular opening in an extension 288 of bracket 284 the upper rim of the funnel lying adjacent the air ring. The cutter mechanism 276 comprises a pair of scissor blades 290 mounted for rocking movement toward and away from each other on a pivot pin 291 secured in bracket extension 288 the scissor blades being located immediately below funnel 287. The opening and closing of the scissor blades 290 is accomplished by a toggle arrangement indicated generally at 292 connected to the core member 293 of a pull solenoid 294 of the spring return type supported on bracket 284. Upon energization of the solenoid and retraction of the core 293 the scissor blades will close to sever yarn ends extending between them and upon de-energization the blades will again be opened to the positions shown in FIG. 14. The coil of the solenoid is connected into an electrical circuit, later to be described in detail, but including a self-closing micro-switch 299 normally maintained open by a follower element carried by the actuating arm thereof riding on the high portion of a cam 303 fixed to camshaft 40 for rotation therewith. The profile of the cam includes a pair of close spaced indentations 304 permitting the micro-switch to close and hence energize the solenoid twice in rapid succession during the rotation of the camshaft.

Slide 277 comprises a rod supported at its opposite ends by brackets 295 in spaced relationship to front plate 36. Slider 285 comprises a sleeve mounted on the rod and supporting, in addition to the brackets previously mentioned, a rearwardly projecting bifurcated arm 296 carrying a roller 297 monted on a pin 298. A follower lever 300 is mounted on follower shaft 42 the forward end of the follower lever extending through an elongated opening in front plate 36 and having a forked end receiving roller 297. The follower lever carries a follower roller 301 adapted to ride on the rim of a cam 302 fixed to camshaft 40 for rotation therewith. The profile of cam 302 is such that following the indexing of the turret to position a bobbin at the second station the air jet means and associated structure is elevated from a position remote from the lower end of the bobbin to a position in which the lower end of the bobbin is within the funnel and adjacent the cutter mechanisms 276, the air jet means and associated structure being retained in such elevated position for a predetermined interval. During such interval the air jets issuing from openings 286 impinge against the lower end of the bobbin stem stripping any tailing windings therefrom and eliminating any entanglement of the tailing end with the starting end. Cam 303 is so related to cam 302 that upon the completion of such interval solenoid 294 is operated through two strokes to insure severing of the extending yarn ends. Upon further rotation of cam 302 follower roller 301 rides toward the low point of the cam restoring the air ring and cutter mechanisms to their inactive positions. The profile of cams 254 previously mentioned controlling the supply of air under pressure to the air ring is such that the air line is open only while the air ring is in its raised active position.

The means 278 for rotating the bobbin while held at the second station comprises (see particularly FIGS. 7 and 16) a drive roll 305 rotatably carried by shaft 306 mounted for rotation in a sleeve 307, the roll being adapted at times to be in driving contact with the annular surface 103 of nut 102 of a bobbin holder at the second station. Sleeve 307 is in turn carried by a lever arm 308 having one end thereof pivotally mounted as at 309 on top plate 34. The upper end of shaft 306 is secured to a sprocket 310 for rotation therewith. Sprocket 310 is driven by a chain 311 carried by sprockets 312 and 313. Sprocket 313 is mounted for rotation with a shaft 314 (see particularly FIG. 9). Shaft 314 projects through a bearing in a bracket 315 supported from top plate 34 and has a bevel gear 316 secured to the lower end thereof. Gear 316 is in mesh with one or the other of a pair of bevel gears 317 and 318, depending upon the direction of winding of the bobbins being readied, mounted on a shaft 319 for rotation therewith. The selected gear 317 or 318 is manually moved along shaft 319 into mesh with spiral gear 316 and secured in such position as by set screw 334 in the preparation for the operation of the bobbin readying device. Shaft 319 is mounted for rotation in bearings in bracket 315 and has a projecting end carrying sprocket 320 for rotation therewith. A second sprocket 321 secured to camshaft 40 for rotation therewith is in driving relation to sprocket 320 through a sprocket chain 322 whereby roller 278 is continuously rotated throughout each cycle of operation of the readying unit.

Inasmuch as it is desirable that the bobbin be rotated only at certain times while at the second station, namely following the operation and then lowering of the air jet means and cutter device, means are provided to move roller 278 into and out of contact with the annular surface 103 of nut 102 of the bobbin holder. For this purpose lever 308 is extended past the roller shaft and has an end thereof secured to one end of a tension spring 323 the other end of which is connected to a pin 324 projecting from the top plate 34 as shown in FIG. 16 whereby lever arm 308 is urged to rotate on its pivot 309 in a clockwise direction to bring roller 278 into driving contact with annular surface 103 of the bobbin holder. To interrupt such contact a bell crank 325 is mounted for rotation on a post 326 projecting upwardly from top plate 34. One arm 327 of the belt crank includes a nose portion adapted to contact a projection 328 on lever arm 308. The other arm of the bell crank is connected by a link 329 to an arm 330 of a lever 331 a second arm of which carries an adjustable abutment screw 332. Referring particularly to FIG. 19 abutment screw 332 is positioned in the path of a stud 333 projecting from arm 71 of bell crank 72 which forms part of the indexing means, the abutment screw 332 being so adjusted that just prior to the arm 71 reaching its extreme counterclockwise position the stud contacts screw 332 and thereafter rocks lever 331 which in turn rocks bell crank 325 to position roller 305 out of contact with annular surface 103 of the bobbin holder. This condition is continued while the cam follower roller 76 is on a high portion of cam 77. However as follower 76 begins to descend toward the low portion of the cam whereby arm 71 of bell crank 72 is rocked in a counterclockwise direction as viewed in FIG. 7 lever 331 and the bell crank are permitted to rotate in a counterclockwise direction permitting roller 305 to move into driving contact with the annular surface 103 under the influence of spring 323 to cause rotation of the bobbin holder and the bobbin held thereby. This action is timed to occur following removal and cutting off of the tailing windings by the mechanism previously described and is continued until follower 76 has passed the low point of cam 77 in the early state of the resetting movement of the indexing mechanism.

Referring now more particularly to FIGS. 7 and 8 the yarn end freeing mechanism 279 previously referred to will be described in more detail. This mechanism is supported from a bracket 335 secured to the front wall 36. The bracket supports a plate 336 mounted for longitudinal adjustment between guides 337 projecting upwardly from the bracket. The adjustment means may suitably comprise a slot 338 in the bracket and a headed stud extending upwardly through the bracket slot and threaded into an opening in the plate. Plate 336 has an extension 339 on which is rotatably mounted a belt crank lever 340 as by stud 341. One arm 342 of the lever carries a plate 343 secured as by bolts 344 to the end of the arm. As will be noted one of the bolts is received in an arcuate slot in plate 343 whereby the plate may be rotated on the other bolt for adjustment. A second arm 345 of lever 340 projects rearwardly and has one end thereof connected to a tension spring 346 the other end of which is connected to an adjustment screw 347 mounted in an upstanding arm 348 whereby the lever is urged to rotate in a clockwise direction to the extent permitted by a stop screw 349 mounted in a second upstanding arm 350. Plate 343 has a projecting arm 353 to which a vertically extending finger 354 is secured. Finger 354 has a projecting corner 356 adapted to press against the yarn of the bobbin, stop screw 347 being adjusted to permit such contact without penetration of the yarn body, and upon rotation of the bobbin in a winding direction, enter under, loosen and lift the final spiral winding of the bobbin over the finger and position it to be picked up by the suction device at the third station as hereinafter described.

Reference will now be made particularly to FIGS. 3, 3A, 7, 16 to 18 and 27 to 34 inclusive in connection with description of the construction and operation of the mechanisms at the third station. Referring first particularly to FIGS. 7 and 16 a drive roller 360 for rotating the bobbin at the third station is mounted on a shaft 361 supported in sleeve 127 previously mentioned (see FIG. 17) projecting upwardly through an opening 363 in the top plate 34 and carried by a lever arm 364 (see FIG. 16). Lever arm 364 is pivoted for rocking movement on the pin supporting sprocket 312. The outer end of lever arm 364 is connected to one end of a tension spring 365 to the other end of which is connected to a pin 367 seecured to the top plate, the spring urging lever arm 364 to rotate in a clockwise direction, as viewed in FIG. 16, such rotation being limited by an adjustable stop 366 carried by the top plate and positioned in the path of rotation of the lever arm. The shaft 361 supporting roller 360 projects above sleeve 127 and carries a sprocket 368. Sprocket 368 is in driving relationship with a sprocket 369, suitably integrally formed with sprocket 312 or otherwise connected thereto for joint rotation, by a sprocket chain 370. As will be understood roller 360 will be constantly driven similarly as roller 305 at the second station but in the opposite direction, namely in a direction to in turn rotate the bobbin at the third station in an unwinding direction. Tension spring 365 will normally maintain the driving relationship between the roller and the bobbin holder. In order to interrupt such driving relationship at the proper time a rod 373 is mounted for sliding movement in bearings 374 secured to top plate 34 the rod having a forward end 375 in the path of and adapted to contact lever arm 364 between sleeve 127 and spring 365. The opposite end of rod 373 (see particularly FIG. 19) is in the path of movement of stud 333 when the lever arm 71 of the indexing mechanism is rocked in a counterclockwise direction as viewed in FIG. 7 to reset the indexing mechanism for an indexing operation. Said end of rod 373 is so positioned that it will be contacted by stud 333 and the rod be shifted to in turn rock lever arm 364 sufficient to separate driving roller 360 from bobbin holder associated with it but only during the final movement of the lever arm in the resetting operation. The movement of sleeve 127 to the right as viewed in FIG. 16 in the separation of the driving roller from the bobbin holder also serves to release latch 120 permitting the bobbin holder to drop to its lower position thereby jutting off the supply of air to the inflatable element 96 whereby the bobbin at the third station is released as previously described.

Referring partirularly to FIGS. 3 and 3A as previously explained suction tube 26 has its mouth 27 adjacent the bobbin held at the third station. During the rotation of the bobbin in the unwinding direction by roller 360 the end of yarn loosened and positioned at the second station is drawn into the suction tube through mouth 27 and upon continued rotation a substantial length of yarn is drawn off the bobbin and into the tube. Hence upon release of the bobbin at the third station the yarn held in the suction tube will extend therefrom through slot 28. A normally closed micro-switch 376 is secured to tube 26 the micro-switch having an actuating arm 377 underlying the slot in the tube whereby the switch will be momentarily opened by the passage of the yarn, assuming it has been successfully drawn into the suction tube, upon release of the bobbin at the third station. The function of the micro-switch will be later explained in connection with the detailed description of the operation of the machine.

Positioned below the bobbin held by the bobbin holder at the third station are mechanisms and means for receiving a bobbin released by the bobbin holder and for transferring a bobbin from the receiving means, when called for by the winder, to an empty receptacle of the winder magazine. Such means and mechanisms are, for the most part, supported by a bracket 380 secured to a fixed base member 381 of the winder magazine as by studs 382 (see FIGS. 3 and 31). The bracket (see particularly FIGS. 3, 27 and 31) comprises an oblong open frame having forward flanges 383 through which the securing studs 382 extend and upwardly projecting side walls 384 terminating through a portion of their widths in outwardly projecting flanges 385 (see FIGS. 27 and 30) to which side wall extensions 386 are secured by studs 387 the side wall extensions suitably including reinforcing ribs 388. The upper portions of the side wall extensions are connected by a rear wall 389 secured thereto as by welding. The open frame portion of bracket 380 includes grooved rails 390 providing a track or slide for a slider 391 (see particularly FIGS. 31 and 33). The walls 384, extensions 386, rear wall 389 and slider 391, when the latter is in the position shown in FIG. 31, define a receptacle 404 (FIG. 3A) for a bobbin released at the third station. Slider 391 is adapted for sliding movement between the position in which it defines a closure for the bottom of the receptacle and a position to the left (not shown) in which the bottom of the receptacle is open to permit a bobbin to drop therethrough. The slider is moved between its righthand and lefthand positions by an air cylinder 392 having a threaded portion protruding through an opening in a rear rail of bracket 380 the cylinder being secured in such position by a nut 394 threaded onto the protruding portion. The air cylinder 392 is of a conventional type in which the forward piston stroke, to the right as viewed in FIG. 27, is effected by supplying air under pressure to the cylinder and its return stroke is effected by spring pressure upon the cutting off of the air supply. Piston rod 395 of the air cylinder is connected to a lug 396 extending downwardly from the lower face of slider 391. Slider 391 carries a normally open micro-switch 397 secured to lug 396 the actuating arm 398 thereof underlying an opening 399 in the slider. A plate 400 having bent up lateral edge portions (see FIGS. 27 and 30) is hinged as at 401 adjacent the rear end of the slider and has a struck out projection 402 extending downwardly and overlying the end of the actuating arm 398 of the micro-switch. A compression spring 403 (see FIG. 33) having one end received in a recess in the slider underlies plate 400 the force of the spring being such as to insure, in the absence of a bobbin on the plate, that the plate will be rotated upwardly on its pivot sufficiently to prevent projection 402 from depressing the actuating arm of micro-switch 397.

A bobbin pusher 405 comprising an arcuate plate having a longitudinal pressed-in rib 406 fills the greater portion of the gap between rear wall 389 and slider 391. A block 407 receives rib 406 in a groove thereof. The bobbin pusher is supported on the end of the piston rod 408 of an air cylinder 409 of similar type to air cylinder 392, an outer end portion of the piston rod of reduced diameter passing through aligned openings in the block and rib base and receiving a nut (not shown) on a threaded end thereof. Air cylinder 408 is supported by a rear plate 393 similarly as air cylinder 392 is supported in bracket 380. A guide rod 410 (see particularly FIG. 28) projects through an aperture in plate 393 and has an end portion of reduced diameter penetrating block 407 and the rib base and receiving a nut 411 on a threaded end thereof. Guide rod 410 has a rear threaded portion on which are mounted an adjustable stop nut 412 and a lock nut 413, the stop nut by contact with plate 393 serving to determine the limit of forward movement of bobbin pusher 405. Guide rod 410 also has a rearward projection 414 in which is rigidly secured a horizontally extending pin 415 for purposes hereinafter described.

Referring particularly to FIG. 29 a wire 420 is secured to the outer side of wall extension 386 adjacent the upper end thereof the wire having an upwardly extending portion and thereafter a downwardly and rearwardly projecting end portion 421. The other wall extension is provided with an upwardly extending bracket 422 to which is secured a branch bracket 423 having a right angle flange 424. The housing of a Bowden cable 425 is secured to flange 424 by a fitting 426. The end of the Bowden cable is connected to a bent end 427 of a wire 428 projecting through aligned openings in flange 424 and bracket 422, the openings being so positioned and the wire being of such length that in the static condition illustrated in FIG. 27 wires 428 and 421 intersect defining a holder for a yarn leading from a bobbin within the receptacle to the yarn end holding member of the magazine. The function of the holder is to maintain the yarn in an elevated position and prevent possible entanglement with the yarn end of a bobbin in the magazine compartment at position 17.

Wire 428 is adapted to be withdrawn upwardly and to the left as viewed in FIG. 29, to permit the yarn end at a certain stage in the operation to slip off wire 421, by operation of the Bowden cable 425 the opposite end portion of the sheathing of which is secured in a lug 430 projecting inwardly from a plate 431 secured to plate 393 and to a flange on the side wall 384 as by bolts 432 one of which is shown in FIG. 28. The lower end of the Bowden cable is secured to, and intermediate the ends of, an arm 433 pivoted as at 434 on a lug 435 projecting inwardly from plate 431. Arm 433 has an offset bifurcated end portion 436 loosely receiving pin 415. As will be understood upon the forward movement of rod 410 arm 433 will be rotated in a clockwise direction as viewed in FIG. 27 thereby, through the medium of the Bowden cable, elevating wire 428. Upon further forward movement of rod 410 arm 433 is rotated to a position in which pin 415 moves out of the bifurcated end portion of the arm. The arm is retained in such position, until pin 415 again enters the bifurcated end portion on the return stroke of rod 410, against a fitting 439 associated with the sheathing of the Bowden cable. The retaining means comprises a tension spring 437 having one end secured to a pin 438 extending from plate 431 and its other end secured to the arm intermediate the ends thereof.

A single action normally open micro-switch 441 is mounted on plate 431 in position to have its actuating arm 443 depressed to close the switch by pin 415 when the pusher is in its retracted position as shown in FIGS. 27 and 28 (see also FIG. 35). A double action micro-switch 444 the actuating arm 445 of which is normally closed against contact 446 (see FIG. 35) is also mounted on plate 431 in position to have its actuating arm contacted by pin 415 and shifted to close against a second contact 447 when the pusher member is in its furthest forward position. The function and operation of the micro-switches will be later described.

Referring again to FIGS. 31 and 33 a threshold plate 450, in substantial alignment with slider 391, is secured at the front of frame 390 as by screws 451. A bracket 452 is secured to the framework of the winder beneath the winder magazine to underlie each magazine compartment when it reaches position 17. The bracket supports a micro-switch 453 of a type which is normally closed but opened upon depression of the actauting member 454 thereof. A plate 455 hinged to the bracket as at 456 (see FIG. 31) overlies the actuating member at an elevation slightly below that of the threshold plate and in position to support the lower end of a bobbin transferred to the bobbin compartment at position 17 the weight of the bobbin being sufficient to depress member 454 and open the switch. The function of the micro-switch will hereafter become apparent.

Air cylinders 394 and 409 for operating the slider 391 and pusher 405, respectively, are connected to a suitable source of air under pressure by hoses 457 and 458 through solenoid operated valves 459 and 460, respectively (see FIGS. 27 and 35). The valves are connected into the electrical circuit for operation at the proper times as will be later explained.

Referring particularly to FIGS. 27 and 32 the wall extensions 386 are each provided with a headed stud 464 projecting outwardly through an elongated longitudinally extending slot 465 adjacent the forward edge of the wall extension. Each stud carries a bushing 466 on which is rotatably mounted the hub portion of a projecting wing member 467. The wing members are adapted to rotate in the bushings by gravity until the wing portions thereof contact the forward edges of the side wall extensions 386, the members when in such position lying in a common plane with their inner ends in adjacent relationship. Wing nuts 468 threaded onto studs 464 against the end of bushings 466 retain the studs in the desired vertically adjusted position in slots 465 and also retain the hubs of the wing members on the bushings. The desired vertically adjusted position of the studs is such that the wing members, when in the position of FIGS. 27 and 32, will lie opposite the stem of a bobbin contained within the receptacle 404.

It will be understood from the above description of the several mechanisms and means that with slider 391 in the position illustarted in FIGS. 27 and 31 a bobbin released at the third station will drop into receptacle 404 and upon contact with plate 400 will rotate the same on its hinge to hold micro-switch 397 closed. Upon the energization of solenoid valve 460 to admit air under pressure to air cylinder 409 pusher 405 will be advanced from the full line position illustrated in FIG. 32 to the dot-and-dash line position illustrated in that figure wing members 467 rotating upwardly as they are contacted by the bobbin and permitting the bobbin to pass therebetween into the bobbin compartment of the magazine. Also during such advance of the pusher wire 428 as previously explained will be withdrawn from its relationship with wire 421 releasing the yarn end leading from the bobbin whereby, following the insertion of the bobbin in the magazine compartment the yarn will extend directly from the bobbin to the yarn end holder of the magazine (see FIG. 3A). Upon retraction of the pusher wing members 467 which in the meantime have returned to their normal positions contact the stem of the bobbin in the compartment and prevent the bobbin from falling back into the receptacle 404. Also upon entry of the bobbin into the magazine compartment the weight of the bobbin will depress plate 455 to open micro-switch 453.

Referring now particularly to FIG. 35 several of the operating mechanisms and control elements previously described are shown diagrammatically in conjunction with an electrical control system including other operating and sequence controlling elements. In the following description of the electrical circuitry, as well as in earlier references thereto, micro-switches are referred to as "normally open" when they automatically open, and "normally closed" when they automatically close, upon the removal of an outside force. Similarly in referring to the movable contactors of relays they are called "normally open" when they open the circuit between their associated fixed contacts upon de-energization of the coil of the relay and "normally closed" when the opposite is the case.

The electrical system in addition to the previously described elements includes a normally open micro-switch 471 having one terminal connected by a lead 472 to a main power lead 473 and a second terminal connected by leads 474 and 475 to one terminal of motor 38 the other terminal of which is connected by a lead 476 to a second main power lead 477. The actuator 478 of micro-switch 471 has a follower riding on the rim of a cam 479 carried for rotation with camshaft 40 whereby when the follower rides onto the high portion of the cam the actuating arm is moved to close the switch. A double action micro-switch 480 having an actuator 481 normally closed against contact 482 is connected by a lead 483 with main power lead 473. Contact 482 is connected by a lead 484 to one terminal of the coil 485 of a relay 486. The other fixed contact of the switch is connected by a lead 487 with a fixed contact 488 of a second relay 489. Contactor 481 has a follower element riding on the rim of a cam 490 mounted for rotation with camshaft 40 the profile of the cam being such that when the follower is on the high portion thereof a circuit is closed between leads 483 and 487 and when on the low portion a circuit is closed between the leads 483 and 484.

A second double action micro-switch 495 has a terminal thereof connected by a lead 496 to main power lead 473. One fixed contact of the switch is connected by a lead 497 to a contact 498 of relay 486. A second fixed contact of the micro-switch is connected by a lead 499 to a terminal 500 of the coil of a third relay 501. The actuating arm 502 of the micro-switch includes a follower riding on a cam 503 secured to camshaft 40 for rotation therewith the actuating arm, when the follower element is on the low portion of the cam, closing a circuit between leads 496 and 497 and, when on the high portion, closing a circuit between leads 496 and 499.

The terminal of relay 486 to which lead 484 is connected is also connected by a lead 505 to a terminal of normally closed microswitch 376 previously referred to, the actuating arm of which is positioned to be contacted by the yarn leading from a bobbin to suction tube 26 to open the switch when the bobbin is released at the third station. The other terminal of micro-switch 376 is connected by a lead 506 to a fixed contact 507 of relay 486. A normally open contactor 508 of the relay is adapted when closed to close a circuit between contact 507 and a second fixed contact 509 connected by a lead 510 to main power lead 473. A normally closed contactor 515 of relay 486 closes a circuit between contact 498, previously mentioned, and a contact 516 connected by a lead 517 to a terminal of micro-switch 453, previously mentioned, which has its actuating arm underlying plate 455 on which the lower end of a bobbin rests when the bobbin is in a magazine compartment at position 17. A second terminal of micro-switch 453 is connected by a lead 518 with a terminal of micro-switch 397 which underlies receptacle 404. A fixed contact of switch 397 is connected by a lead 519 to one terminal 520 of the coil of a relay 504 the other terminal of which is connected to main power lead 477 by lead 527. Terminal 520 is also connected by a lead 521 with a fixed contact 522 associated with a normally open contactor 523 of relay 504. The other fixed contact 524 associated with contactor 523 is connected by a lead 525 to contact 446 of micro-switch 444 previously referred to. The movable contactor 445 of switch 444 normally closed against contact 446 is connected by a lead 526 to main power lead 473.

Referring again to relay 486 a second normally closed contactor 530 thereof is adapted to close a circuit between a lead 531 connected to main power lead 473 and a lead 532 connected to terminal 500 of relay 501. Now referring again to relay 489 a first normally open contactor 533 thereof is adapted upon energization of the relay coil to close a circuit between lead 487 previously mentioned and a lead 534 connected to one terminal of the relay coil. The other terminal of the relay coil is connected by a lead 535 to main power lead 477. The first mentioned terminal of relay 489 is also connected by a lead 536 to a contact 537 associated with a normally closed contactor 538 of relay 501. The other contact associated with contactor 538 is connected by a lead 539 with main power lead 473. The first mentioned terminal of relay 489 is also connected by a lead 540 with a contact 447 of micro-switch 444 previously referred to. The second terminals of the coils of relays 486 and 501 are connected by leads 541 and 542 respectively to main power lead 477.

Relay 501 has a normally open contactor 545 adapted when closed to close a circuit between a lead 546 connected to main power lead 477 and a lead 547 connected to a terminal of solenoid valve 459, which controls the admission of air under pressure to air cylinder 392. The other terminal of solenoid valve 459 is connected by a lead 548 to main power lead 473. Referring again to relay 489 the latter includes a second normally open contactor 550 adapted when closed to close a circuit between a lead 551 connected to main power lead 473 and a lead 552 connected to a terminal of micro-switch 267 mounted on the bobbin chute 264. A second terminal of switch 267 is connected by a lead 553 to a contact 554 of micro-switch 441 which is closed as previously explained when pusher 405 is in its retracted position. The other terminal of switch 441 is connected by a lead 555 to leads 474 and 475.

One terminal of solenoid valve 460 is connected by a lead 557 to a fixed contact 558 of relay 504 and its other terminal is connected to main power lead 473 by lead 556. A normally open contactor 559 of relay 504 is adapted to close a circuit between fixed contact 558 and a fixed contact connected by a lead 560 with main power lead 477. One terminal of cam operated switch 299 which controls the operation of the cutter mechanism 276 at the second station is connected by a lead 561 to main power lead 473 and a lead 562 connects the second terminal of the switch to one terminal of the coil of solenoid 294 which actuates the cutter the other terminal of the coil being connected by a lead 563 with main power lead 477.

The operation of the several bobbin readying mechanisms and of the means for delivering a readied bobbin to the winder magazine all under the control of the electrical circuitry and cam operated means previously described will now be pointed out in detail. A starting condition will be presumed in which bin 255 contains a supply of bobbins in the condition they are received from the spinning machine and with their bases to the left as viewed in FIG. 1; the buckets 256 on the ascending side of conveyor 257 (FIG. 25A) contain bobbins; a bobbin has been successfully discharged by the conveyor and rests in bobbin tray 140 of the elevator which is in its lowered position; a bobbin is held by the bobbin holder of the turret arm overlying the elevator at the first station; a bobbin with its yarn end freed is held by the bobbin holder of the overlying turret arm at the second station; the bobbin holder of the overlying turret arm at the third station is empty the bobbin formerly carried thereby having been deposited in receptacle 404; a bobbin is in the winder magazine at position 17; and the cams 479, 490, 503 and 303 are in the positions illustrated in FIG. 35. Under such circumstances the coils of relays 486, 489 and 504 are de-energized, the coil of relay 501 is energized and both circuits to motor 38 are open. Also the actuating arm of each of the several micro-switches is in the position shown in FIG. 35.

It will now be assumed that a replenishment bobbin is called for by the control system of the winder and consequently the winder magazine is indexed to shift the magazine compartment and the bobbin therein from position 17 and bring an empty compartment into such position. Upon the removal of the bobbin overlying plate 455, which in turn overlies the actuating arm of micro-switch 453, the switch is permitted to close thereby energizing the coil of relay 504. As a result contactor 559 closes the circuit to solenoid valve 460 the valve opening to admit air under pressure to air cylinder 409. Upon the resultant forward stroke of pusher 405 the bobbin in receptacle 404 is shifted into the empty compartment of the magazine thereby permitting micro-switch 397 to open and again opening micro-switch 453.

The opening of micro-switch 397 upon the removal of the bobbin from receptacle 404 serves to break the circuit to the coil of relay 504 through leads 518 and 519 but nevertheless the relay coil remains energized until the completion of the stroke of pusher 405 by reason of the holding circuit set up through now closed contactor 523. However upon the completion of the stroke of the plunger the actuating arm 445 of micro-switch 444 shifts from contact 446 by pin 415 whereby the relay is de-energized opening the circuit to solenoid valve 460 and thereby permitting the return of the piston of air cylinder 409 and the retraction of the pusher 405 to its starting position. Upon its movement to its forward position the pusher pin 415 also closed the actuating arm of micro-switch 444 against contact 447 thereby closing the circuit through lead 540 to relay 489. Energization of the relay closed normally open contactor 533 thereby closing a holding circuit to the relay coil whereby the relay remains energized following the start of the return stroke of the pusher and the opening of switch 444 relative to contact 447.

The energization of relay 489 also closed normally open contactor 550 which, upon the return of the pusher to its rearmost position and the consequent closing of microswitch 441, closes a circuit through leads 551, 552, 553, 555 and 475 contactor 550 and micro-switch 267 to motor 38 to start the rotation of camshaft 40. The profiles of the various cams on the camshaft are such and the cams are so positioned that upon rotation of the shaft the turret indexing mechanism is first actuated through an indexing stroke to rotate the turret in a clockwise direction as viewed in FIG. 16 to shift the bobbin holder and the bobbin thereon at the first station to the second station, the bobbin holder and bobbin thereon at the second station to the third station and the empty bobbin holder at the third station into bobbin receiving position at the first station all as previously pointed out. By the completion of the indexing operation the elevator is in its ascent and as it approaches its upper level it delivers the bobbin carried therein to the bobbin holder of the overlying turret arm. Also following completion of the indexing movement air jet means 275 and cutter mechanism 276 are shifted to their elevated position to perform their successive functions on the bobbin held thereat the continued rotation of the camshaft bringing the indentations 304 of cam 303 opposite the follower end of the actuating arm of micro-switch 299 at the proper time whereby solenoid 294 is energized to operate the cutter mechanism through two strokes as previously pointed out. The air jet means and cutter mechanism are then restored to their low position. In the meantime conveyor 257 is advanced to advance a bucket thereof toward its bobbin discharge position, the indexing mechanism is in its resetting stroke whereby drive roller 278 at the second station is in contact with the bobbin holder thereat, and the elevator is descending. By the time the resetting of the indexing mechanism is completed, which occurs toward the end of a cycle of operation, the elevator is again in its lowered position with the tray rocked to its inclined bobbin receiving position and the conveyor is advanced sufficiently to discharge a bobbin from a bucket thereof through chute 264 into the tray. During its passage from the chute micro-switch 267 is momentarily opened but this is immaterial as the circuit of which it is a part is open at this time. The completion of the resetting stroke of the indexing operation also shifts drive roller 360 away from the bobbin holder at the third station and simultaneously rotates latch 122 to release the bobbin holder from its elevated position thereby shutting off the flow of air to the inflatable element thereof permitting the bobbin to drop into receptacle 404 as previously explained.

The rotation of the camshaft during the occurrence of the foregoing events, the camshaft rotating in the direction of the arrow as shown in FIG. 7, also shifter actuating element 502 of micro-switch 495 against the contact defining the terminals of lead 499 thereby closing a holding circuit including leads 496 and 499 to the terminal 500 of the coil of relay 501, the other terminal of which is directly connected to main power lead 477 as previously noted. Thereafter continued rotation of the camshaft closes micro-switch 471 whereby a circuit is closed to motor 38 through leads 472, 474 and 475 to continue the energization of the motor after the circuit through the actuator 550 of relay 489 is opened as noted below. Further rotation of the camshaft permits the actuating arm of micro-switch 480 to shift to open the holding circuit including leads 483 and 487 to one terminal of the coil of relay 489 whereby the relay is de-energized it being recalled that the circuits to the coil including leads 536 and 540 were previously opened. The shifting of the actuating arm 481 of micro-switch 480 as the follower element rides on the low portion of cam 490 also closes the circuit between leads 483 and 484 to energize the coil 485 of relay 486 which up to this point in the cycle has remained de-energized.

The energization of the coil of relay 486 closes contactor 508 thereof against contacts 507 and 509 thereby closing the holding circuit through leads 510, 506, micro-switch 376 and lead 505 to the coil of the relay. The energization of the coil of relay 486 also opens normally closed contactor 530 thereby opening one circuit to the terminal 500 of relay 501. As the camshaft continues to rotate the follower of actuator lever 481 again rides on the high part of its cam but due to the holding circuit the coil of relay 486 remains energized.

As the camshaft approaches the completion of one revolution the release of a bobbin held at the third station is effected as previously explained. During the movement of the bobbin into receptacle 404 the yarn leading from the bobbin, assuming it has been successfully drawn into suction tube 26, momentarily opens switch 377 thereby de-energizing the coil of relay 486 and permitting the contactors thereof to return to the positions shown in FIG. 35 whereby the circuit to terminal 500 of the coil of relay 501 through leads 531 and 532 is again restored. During the final part of the rotation of the camshaft the follower on the actuating arm 478 of micro-switch 471 again rides onto the low portion of cam 479 opening the circuit to motor 38 and stopping the rotation of the camshaft which has now made one complete revolution. The final rotation of the camshaft also brings the low point of cam 503 beneath the follower on the actuating arm 502 of micro-switch 495 whereby the circuit through leads 496 and 499 to the terminal 500 of relay 501 is opened but the relay remains energized through the circuit comprising closed actuator 530 and leads 531 and 532 mentioned above. At this point the starting conditions have been restored, assuming again that a bobbin passed successfully through chute 264 to the elevator tray, and the bobbin readying unit will remain in a static condition until the winder magazine is again indexed at which time the entire operation will be repeated.

In the event that the bobbin discharged from the conveyor stuck in chute 264 micro-switch 267 is held open. As a result at the point in the next cycle where motor 38 is to be energized through the circuit including micro-switch 267 the operation will come to a stop until the fault is corrected.

In the event the yarn end is not picked up and drawn into the mouth 27 of the suction tube at the third station upon release of the bobbin micro-switch 376 remains closed and relay 486 energized with the result that the circuits to terminal 500 of relay 501 including contactor 530 remain open. Hence when the follower of actuator 502 of micro-switch 495 rides onto the low point of cam 503 both circuits to terminal 500 of relay 501 are open and the coil of the relay is de-energized. As a consequence normally open contactor 545 of relay 501 opens interrupting the circuit to solenoid valve 459 controlling the operation of air cylinder 392 whereby the spring return of the air cylinder shifts the piston rod to the left also shifting slider 391 to the left as viewed in FIGS. 27, 31 and 35 such movement opening the bottom of receptacle 404 and permitting the bobbin released at the third station to drop therethrough into a reject receptacle of any suitable type (not shown). De-energization of the coil of relay 501 also causes normally open contactor 537 to close the circuit through leads 539 and 536 to the coil of relay 489 again energizing the relay. Energization of relay 489 causes the closing of contactor 533 of that relay whereby the coil of relay 501 is again energized and the various electrical elements are restored to the condition required to again energize motor 38 through the closed actuator 550 of relay 489, closed micro-switches 267 and 441, and leads 551, 552 553, 555 and 475. Hence the camshaft will be rotated through a second cycle, or more if the same fault continues to occur, to again perform the several bobbin readying operations.

Having thus described the invention in rather complete detail it will be understood that these details need not be strictly adhered to, and that various changes and modifications may be made all falling within the scope of the invention as defined by the following claims.

We claim:

1. In an apparatus for preparing full bobbins, as they are received from the spinning machine, said bobbins having hollow stems and a wound yarn body thereon for rewinding of the yarn thereof into packages by a winder said apparatus including means for conveying bobbins in succession from a first to a second and then to a third station, means for delivering a bobbin from a supply thereof to said conveying means at said first station, means at said second station operable on a bobbin thereat to provide said yarn body with a freed end and means at said third station for finding and holding the freed yarn end of a bobbin thereat the improvement wherein said means at said second station includes means to position said freed end intermediate the ends of the bobbin for finding and holding means at said third station.

2. An apparatus as defined in claim 1 wherein said conveying means comprises a multiple armed turret in fixed vertical position and indexable to successively position each arm thereof at each said station, and there is a bobbin attaching means carried by each arm.

3. In an apparatus as defined in claim 2 wherein said attaching means comprises an inflatable element movable relatively to the arm by which it is carried between a first deflated position and a second position and adapted when deflated at said first position to enter the hollow stem of a bobbin, means operable upon movement of said inflatable element to said second position to inflate the same and means to latch said inflatable element in said second position.

4. In an apparatus as defined in claim 3 wherein said inflatable element is carried by a rod movable with said inflatable element and having an air passageway leading to the interior of the inflatable element and to an inlet opening and said means operable on movement of said inflatable element and hub to said second position to inflate the inflatable element comprises means for supplying air under pressure comprising an air passageway having an outlet in alignment with said inlet opening of said rod when the inflatable member is in said second position.

5. In an apparatus as defined in claim 4 wherein said means for delivering a bobbin from a supply thereof to said first station comprises an elevator and means to cause said elevator to travel from a lower bobbin receiving level to an upper level to elevate a bobbin therein, and there is means to, during said travel, align the hollow stem of said bobbin with said inflatable element, said inflatable element entering said hollow stem during said travel and being raised by said bobbin to said second position.

6. In an apparatus as defined in claim 1 wherein said means for delivering a bobbin from a supply thereof to said first station comprises an elevator adapted to travel between a lower bobbin receiving level and an upper level, said elevator includes a bobbin receptacle rockable between an inclined bobbin receiving position and an upright position, and there is means operable upon the travel of said elevator toward said lower level to rock said receptacle to said inclined position and upon travel of said elevator toward said upper level to rock said receptacle to said upright position.

7. In an apparatus as defined in claim 6 wherein said means to rock said receptacle between said inclined and upright positions comprises cam and follower means.

8. In an apparatus as defined in claim 6 wherein there is a bobbin hopper and a conveyor for conveying a succession of bobbins from said hopper and there is means to advance said conveyor to deliver a bobbin to said receptacle when the latter is in said inclined position.

9. In an apparatus as defined in claim 1 wherein said means at said second station to provide said yarn body with a freed end comprises means for supplying an annular blast of air directed substantially axially of said bobbin, means to move said air blast supplying means between a remote position and a second position in which it surrounds said bobbin whereby said blast of air serves to dislodge any tailing and starting windings on said bobbin, and means movable with said air blast means to sever any said dislodged windings.

10. In an apparatus as defined in claim 1 wherein said means to position the freed end of yarn comprises means to rotate said bobbin in a winding direction and means to engage and elevate a portion of a final spiral winding thereof.

11. In an apparatus as defined in claim 9 wherein said means to sever any said dislodged windings comprises a cutter and means to operate the same subsequently to the initiation of the dislodging action of said air blast supplying means.

12. In an apparatus as defined in claim 1 wherein said means at said third station for finding and holding a freed yarn end comprises means for rotating a bobbin held thereat in an unwinding direction, a suction nozzle, an end conveying tube leading from said suction nozzle and means for creating a flow of air into said nozzle and through said tube, said tube having a longitudinal slot therein for extension of said end therethrough.

13. In an apparatus as defined in claim 1 wherein said apparatus is in association with an automatic winder having a rotary magazine including bobbin receiving compartments and said means to receive a released bobbin comprises a bobbin receptacle adjacent said magazine and there is means to shift a bobbin deposited in said receptacle into a compartment of said winder.

14. In an apparatus as defined in claim 12 wherein said magazine includes means for holding the leading yarn ends of the bobbins in the bobbin receiving compartments thereof, said means at said third station for finding and holding said leading end of a bobbin thereat includes means for transferring the same to said end holding means of the magazine, there is means for detecting whether the leading end of the bobbin released at said third station has been found and held by said end finding and holding means, and there is means for ejecting said bobbin from said receptacle in the event said leading end has not been so found and held.

15. In an apparatus as defined in claim 12 wherein said magazine of said winder includes means for holding the leading yarn ends of bobbins in the bobbin receiving compartments thereof and said means at said third station for finding and holding a leading end of a bobbin thereat includes a suction nozzle and a conduit leading therefrom to said end holding means of the magazine, said conduit having a longitudinal slot therein whereby a yarn end leading from a released bobbin can traverse said conduit to said magazine end holding means.

16. In an apparatus for preparing full yarn bobbins as they are received from a spinning machine for rewinding the yarn thereof into packages by a winder having a compartmented bobbin storing magazine the improvement comprising indexible means for conveying bobbins in succession from a first to a second and to a third station, means for delivering bobbins from a supply thereof to said first station for attachment to said indexible conveying means, means at said second station to perform preparatory operations on a bobbin held by the conveying means thereat including the freeing of a leading yarn end thereof, means at said third station to find and hold a freed leading yarn end of a bobbin held by the conveying means thereat, a bobbin receptacle adjacent said magazine, means for releasing a bobbin from said conveying means at said third station for transfer to said receptacle, means for transferring a bobbin from said bobbin receptacle to a compartment of said magazine and means operable upon said transfer to index said indexible conveying means to convey a bobbin from said first station to said second station and to convey a bobbin from said second station to said third station, and to thereafter activate the preparatory means at said second station and the end finding means at said third station and to activate said bobbin releasing means.

17. In an apparatus for transferring a bobbin from a supply thereof to an elevated bobbin holding means the improvement comprising an elevator movable between a lower bobbin receiving level and a higher level for transfer of a bobbin to said holding means said elevator comprising a bobbin receptacle mounted for rocking movement between an inclined position and a substantially upright bobbin transfer position, means for moving said receptacle between said positions, means for holding a bobbin in relatively fixed position within said receptacle movable between bobbin holding and bobbin releasing positions, and means for moving said bobbin holding means between said positions.

18. An apparatus as claimed in claim 17 wherein said means for holding a bobbin in a relatively fixed position comprises a pair of jaws mounted for rotation between jaw opening and jaw closing positions and there is means for rotating said jaws between said positions.

19. An apparatus as claimed in claim 18 wherein said means for rotating said jaws between jaw closing and jaw opening positions comprises cam means to rotate said jaws to said bobbin releasing position, means to latch said jaws in said bobbin releasing position, resilient means to urge said jaws to rotate to said bobbin holding position and means to release said latch means for rotation of said jaws to said bobbin releasing position under the urging of said resilient means.

20. In an apparatus for preparing full bobbins as they are received from a spinning machine, said bobbins having a final spiral winding terminating in a tailing end normally entangled with a starting end for further operations thereon, the improvement comprising means supporting said bobbin for rotation, air jet means positioned to direct a blast of air toward the position of said entangled windings of a bobbin supported by said supporting means to separate them and project them longitudinally away from the bobbin, means to sever said projecting ends, means to thereafter rotate said bobbin in a winding direction on said bobbin supporting means and means operable during said rotation to separate and elevate the end of said final spiral winding.

21. In an apparatus as defined in claim 20 wherein there is means supporting said air jet means and said severing means for movement between active and inactive positions, there is means for moving said air jet means and said severing means between said positions, and there is control means to operate said bobbin rotating means upon movement of said air jet means and severing means from their active to their inactive positions.

References Cited

UNITED STATES PATENTS

| | | | |
|---|---|---|---|
| 2,675,971 | 4/1954 | Abbott | 242—35.6 |
| 3,111,280 | 11/1963 | Reiners et al. | 242—35.5 |
| 3,224,694 | 12/1965 | Oishi | 242—35.5 |
| 3,295,776 | 1/1967 | Cruickshank et al. | 242—35.6 |
| 3,329,362 | 7/1967 | Kieronski | 242—35.6 |
| 3,358,940 | 12/1967 | Beckwith et al. | 242—35.5 |
| 3,368,766 | 2/1968 | Livingston | 242—35.5 |
| 3,381,908 | 5/1968 | Igushi et al. | 242—35.5 |

STANLEY N. GILREATH, Primary Examiner

U.S. Cl. X.R.

242—35.5